United States Patent Office 3,640,983
Patented Feb. 8, 1972

3,640,983
METHOD OF MAKING COUPLER-BONDED-POLYMERS AND CHROMOGEN-BONDED-POLYMERS, AND POLYMERS MADE THEREBY
Shojiro Horiguchi, 965 Shimohoya, Hoyamachi, Kitatama-gun, Tokyo, Japan, and Michiei Nakamura, 156, 5-chome, Motobuto-cho, Urama-shi, Saitama-ken, Japan
No Drawing. Filed Nov. 9, 1966, Ser. No. 593,002
Int. Cl. C08f 3/50, 3/64, 3/90
U.S. Cl. 260—89.7
7 Claims

ABSTRACT OF THE DISCLOSURE

A method of making a coupler-bonded-polymer capable of being coupled with a diazonium compound, which comprises the steps of diazotizing a coupler containing a primary amino radical to produce a diazotized product stabilizing such diazotized product with a stabilizer to produce a stabilized diazonium compound, mixing the stabilized diazonium compound with an ethylenically unsaturated polymerizable monomer and polymerizing the monomer by utilizing the stabilized diazonium compound as a polymerization initiator to produce a coupler-bonded-polymer. A method of coloring articles with the use of the coupler-bonded-polymer thus produced is also provided.

---

This invention relates to color-forming polymers and colored polymers. More particularly, it relates to a novel coupler-bonded-polymer and a novel chromogen-bonded-polymer, a method of making such novel coupler-bonded-polymer and novel chromogen-bonded-polymer, and a process for coloring articles therewith.

Known dyes which have been generally utilized in the dyeing industry, while satisfactorily bright in color, are characterized by weak resistance to light, heat, chemicals, migration, solvents, etc. By contrast, pigments generally have characteristics satisfactory resistance but the brightness of their color and the transparency thereof are much inferior to conventional dye both in the case of a single color as well as that of combined colors. Therefore, in using a pigment which is inherently of much larger particle size than a dye, as a coloring agent, the pigment has to be repeatedly kneaded with solvents, varnishes, plasticizers, plastics and the like, using various dispersing apparatus to obtain smaller particles.

In general, pigment molecules or pigment particles tend to aggregate or flocculate during a pressure filtering process, and may further aggregate again several times during the drying process to form very hard clusters. Pigment, once formed into such hard clusters, can never again be dispersed completely satisfactorily with mechanical devices. As particles of pigment are much larger than those of dyes to begin with, not only are pigments insufficiently transparent but also their brightness in color is much inferior to that of dyes. Furthermore, large particles result in a lowering of abrasion resistance in case of coatings, and in a degradation of mechanical and electrical properties in the case of mixed coloring and inner coloring, and thus adversely affect the colored material to cause aging, degradation, excoriation and delamination thereof.

Accordingly, it is an important object of this invention to provide a chromogen-bonded-polymer which overcomes the aforesaid defects of dyes and pigments, i.e., which has a high degree of transparency and high tinting strength, and which is characterized by superior retention of physical, mechanical and electrical properties, and good resistance to chemical and physical wear.

A chromogen-bonded-polymer is a colored polymer in which a chromogen portion is directly and chemically bonded to a polymer portion. It has been found to be an excellent coloring agent having a brightness of color comparable to that of dyes, light and chemical resistance characteristics which are comparable to those of pigments and fixing strength comparable to that of high-polymer binders.

It is another object to provide a method of making a coupler-bonded-polymer.

A coupler-bonded-polymer is one in which a coupler portion is directly bonded to a polymer portion. It is a further object to provide a method of making the aforesaid chromogen-bonded-polymer through thee coupling of the coupler-bonded-polymer produced in accordance with the preceding object with a suitable diazonium compound.

It is still another object to provide a method of making a coloring agent for various materials from the coupler-bonded-polymer and the chromogen-bonded-polymer produced according to the invention.

It is still a further object to provide a method for coloring articles with the coloring agent produced in accordance with the immediately preceding object.

In the generally employed method for producing a pigment coloring agent, such as various kinds of paint, printing ink, ball-point pen ink, and plastic-coloring agent, dry pigment is mixed with solvent, varnishes, plasticizers and like materials and the resulting mixture is mechanically dispersed using various types of dispersing apparatus. In such method, it is quite difficult to disperse the second stage particles of condensation forward during the pigment dispersing process and to disperse the third stage particles formed during the drying process to the size of the first stage particle.

Such defects in the production of producing pigment coloring agents are overcome by the use of a chromogen-bonded-polymer in which the chromogen portion is chemically and directly bonded to the polymer portion. In such chromogen-bonded-polymer where the chromogen portion consists of a homocyclic or heterocyclic compound such as metal phthalocyanine blue or green, indigo, thioindigo, perylene, phthaloperinone, quinacridone, carbazoldioxazine, etc., or a condensation azo pigment, these compounds are relatively high in molecular weight and are correspondingly difficultly soluble or dispersible in a solvent.

It has been found that an effective method for producing the chromogen-bonded-polymer using the aforementioned compounds as the chromogen portion consists of introducing the $NH_2$ radical into the chromogen by a suitable method to form the amino compound thereof, diazotizing the latter amino compound, and mixing the obtained diazonium salt with suitable addition-polymerizable monomers, and polymerizing the monomers using the chromogen containing diazonium salt as a polymerization initiator.

Where the chromogens are non-polar dyes of lower molecular weight, which are respectively soluble in an oil or water soluble dye of the aforementioned chromogen group, it has also been found effective in making the chromogen-bonded-polymer to introduce into such chromogens and derivatives thereof, addition-polymerizable functional radicals to copolymerize the addition-polymerizable chromogen with addition-polymerizable monomers in a suitable solvent.

According to this invention, there is first made an intermediate having the general formula (Coupler)—$N_2X$ wherein X is selected from the group consisting of a heavy metal double salt residue, an inorganic acid salt residue, an organic acid salt residue, a diazo amino residue and a diazothioether residue and (Coupler)— is a radical capable of being coupled with a diazonium compound of a primary aryl amine. Thus, there is first made an intermediate having in its structure the —NH₂ radical and the coupler radical.

The method of producing the coupler-bonded-polymer comprises diazotizing a coupler-containing aromatic amino compound with sodium nitrite in aqueous medium containing hydrochloric acid to produce the diazotized product comprising the coupler-containing diazonium compound, stabilizing this diazotized product with a material selected from the group consisting of heavy metal salts, inorganic acids, salts of inorganic acids, organic acids, salts of organic acids, thiophenol and amino compounds, mixing the stabilized product with an addition-polymerizable monomer and polymerizing the monomer utilizing said stabilized product as an initiator of said polymerization to form the coupler-bonded-polymer.

As the stabilizers, there may be used, for example, heavy metal salts such as zinc chloride, stannic chloride, calcium chloride, barium chloride, aluminum chloride, etc., inorganic acids and salts thereof such as fluoroboric acid, sodium fluoroborate, organic sulfonic acids and salts thereof such as dodecylbenzene sulfonic acid, p-chlorobenzene sulfonic acid, naphthalene-1.5-disulfonic acid, naphthalene-2.6-disulfonic acid, polymethylene-naphthalene polysulfonic acid and their homologs and their salts and alkyl sulfuric acid and its salts such as lauryl sulfuric acid, etc., and its salt, amino compounds such as 2-methyliminobenzoic acid-5-sulfonic acid, N-methyltaurine, sarcosine etc. and thiophenol such as β-thionaphthol, 4-tert-butylthiophenol and the like.

Further, it may be more effective in some industrial situations for the polymerization to be carried out in the presence of a diazo-decomposing agent, which is a compound operative to decompose the (Coupler)—N₂X compound to form a coupler free radical and is selected from the group consisting of sulfur-containing compounds, metals which are of high electric positivity in the electromotive series, salts of the lower valence states of polyvalent metals, suboxygen acids and their salts, hydrazines, polyhydric phenols and the like and mixtures consisting of two or more compounds selected from the above compounds.

As the diazo-decomposing agents, there are used, for example, sulfur-containing compounds such as sodium sulfide, sodium polysulfide, ammonium sulfide, ammonium polysulfide etc. higher electric positive metals such as copper, zinc, tin, magnesium, iron, lead, etc., metal salts in their lower valence state such as ferrous chloride, ferrous sulfate, stannous chloride, titanium trichloride, chromous chloride, etc., hydrazines such as phenylhydrazine hydrochloric acid salt, p-methylphenylhydrazine hydrochloric acid salt, etc., polyhydric phenols such as catechol, pyrogallol, etc., suboxygen acids and their salts such as sulfoxylic, hyposulfurous, sulfurous, dithionic, and thiosulfuric acids and their salts such as the alkali metal sulfoxylates, hyposulfites, sulfites, dithionates and thiosulfates and the mixture consisting of two or more compounds selected from the above compounds.

The stabilized diazonium salt or stabilized diazo compound is decomposed by the action of the decomposing agent with the discharge of nitrogen gas while simultaneously forming radicals which function as an initiator in the polymerization of monomers to effect the forming of a coupler-bonded-polymer wherein the two portions are directly and chemically bonded.

The (Coupler)— in the formula (Coupler)—N₂X which is a radical capable of coupling with a diazonium component may be one selected from the group consisting of

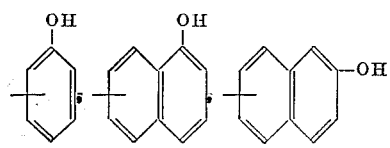

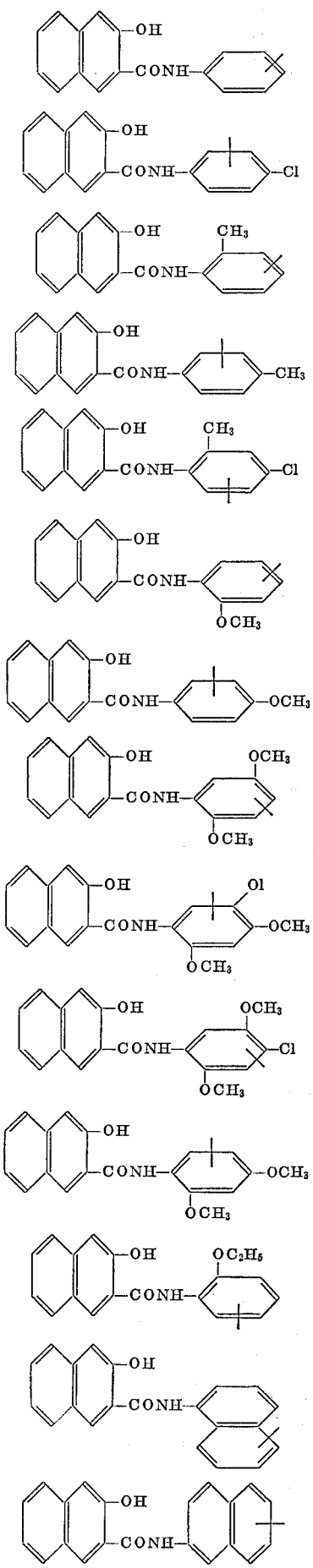

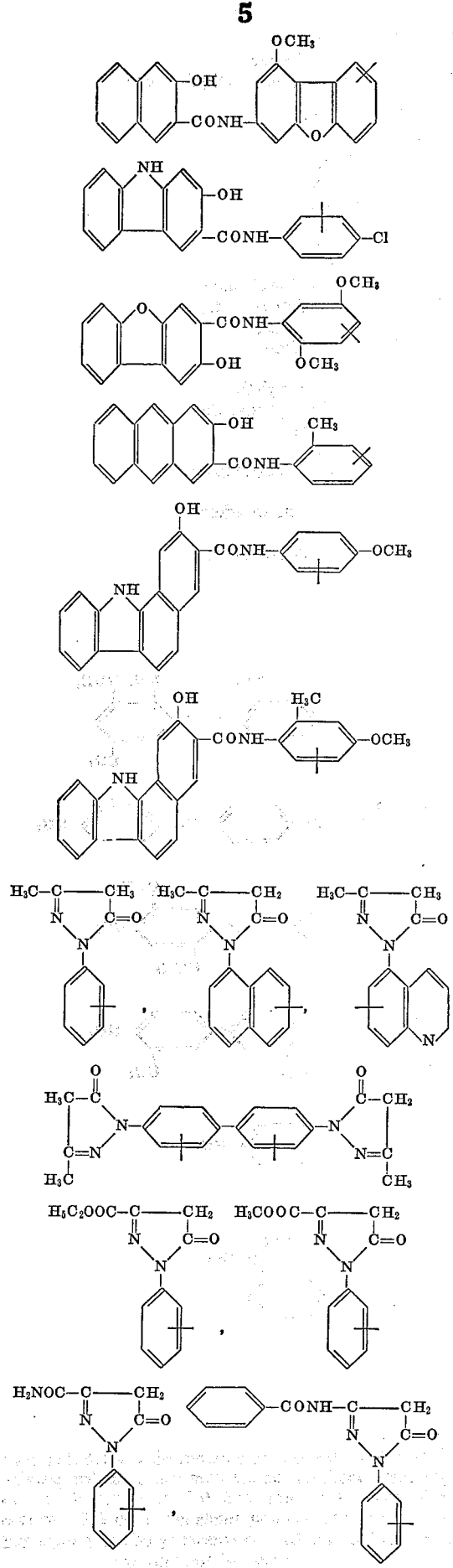
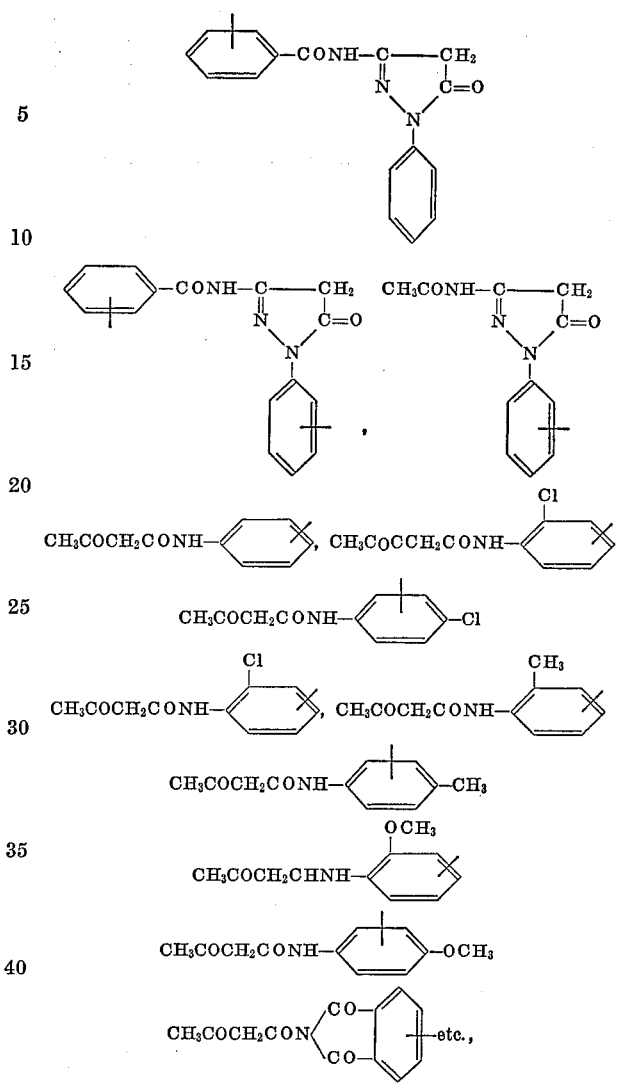

and compounds containing sulfonic acid radical or carboxylic acid radical on the above mentioned compounds, such as sulfonated coupler radicals of

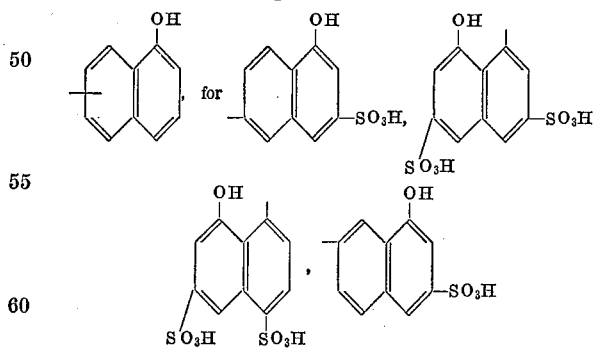

and the like.

In the coupler-bonded-polymer which has a hydrophobic polymer portion as well as a hydrophilic polymer portion, the alkali salt such as the sodium salt of the coupler portion is formed in an alkaline solution. Thus, the hydrophobic polymer is readily soluble or finely dispersible in alkaline solution. Such ready alkaline solution solubility enables the polymer to be readily coupled when a suitable separately produced diazonium component is added thereto. With the latter addition, there results the production of the chromogen-bonded-polymer at a high yield rate. The coupler-bonded-polymer is also coupled with the diazonium component in the material being colored.

If two or more diazonium compounds are utilized to produce the chromogen-bonded-polymer, there results the presence of such two or more chromogen portions in the structure of the chromogen-bonded-polymer and its color is the resultant of the mixed different colors imparted by the chromogens.

Either pigment or dye type of chromogen portion in the chromogen-bonded-polymer will be freely available depending upon the selection of the type of diazonium compounds which are added to the coupler-bonded-polymer and consequently colors such as greenish yellow, orange, red, pink, violet, blue indigo, and black, etc. can be readily obtained.

As the amino compound, i.e., base which may be employed to produce the diazonium compound which is to be utilized for coupling with the coupler-bonded-polymer to produce the chromogen-bonded-polymer, an aromatic compound having an amino radical in its structure can be so used. Examples of such aromatic compounds are detailed hereinbelow.

o-chloroaniline,
m-chloroaniline,
o-nitroaniline,
m-nitroaniline,
6-chloro-2-toluidine,
4-benzylsulfonyl-o-anisidine,
5-chloro-2-amino-1-trifluoromethylbenzene,
β-naphthylamine,
p-chloro-o-nitroaniline,
p-nitroaniline,
m-nitro-p-toluidine,
p-chloro-o-toluidine,
5-chloro-o-toluidine,
5-nitro-o-toluidine,
4-chloro-2-anisidine,
5-nitro-o-anisidine,
o-anisidine-4-sulfon-n-butylamide,
o-anisidine-4-sulfon-diethylamide,
4-ethylsulfonyl-o-anisidine,
6-benzamido-m-4-xylidine,
2-amino-diphenyl,
4-chloro-2-amino-diphenylether,
4.4'-dichloro-2-aminodiphenylether,
α-aminoanthraquinone,
m-nitro-p-anisidine,
4-amino-2.5-dimethoxybenzonitrile,
α-naphthylamine,
4-chloro-6-benzamido-m-anisidine,
benzidine,
2.6-dichloro-p-phenylenediamine,

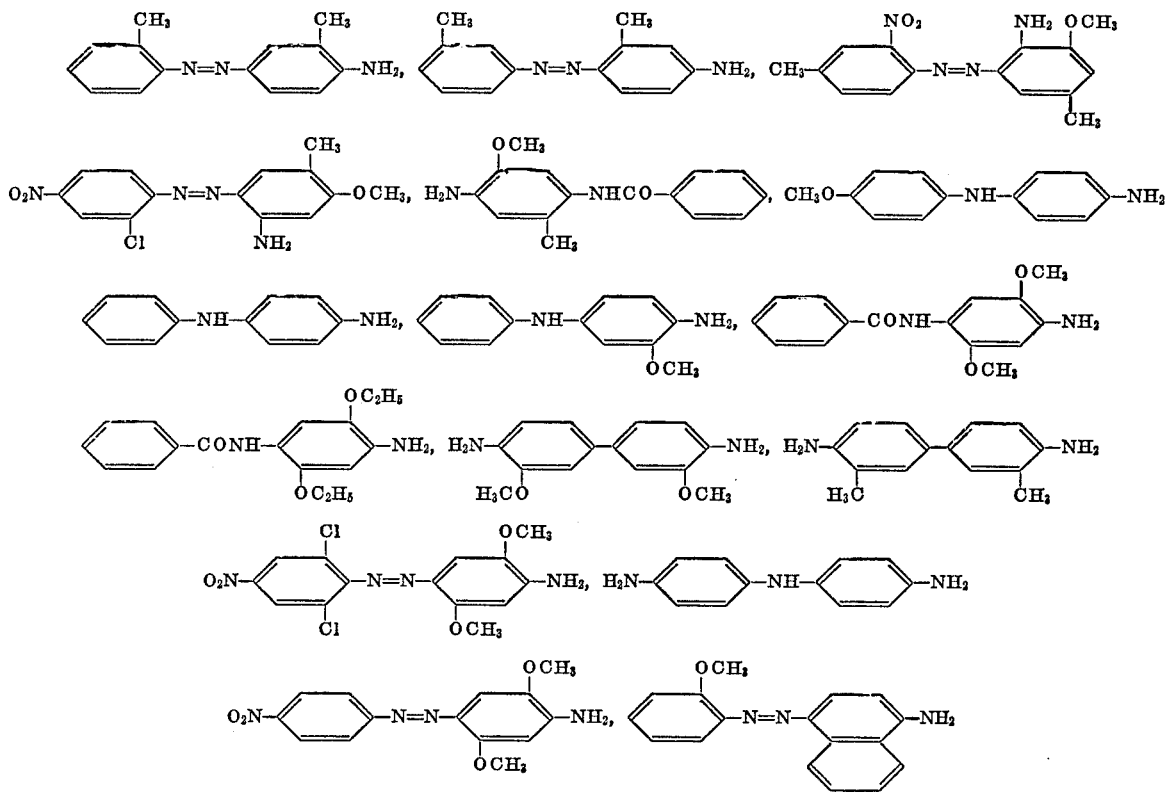

5-amino-1.3-bistrifluoromethyl-benzene,
o-(phenyl-sulfonyl)aniline,
4-chloro-3-amino-1-trifluoromethylbenzene,
2-ethylsulfonyl-5-trifluoromethylaniline,
2.5-dichloroaniline,
p-nitro-o-toluidine,
p-nitro-o-anisidine, and the like.

There follows immediately hereinbelow a tabulation of the coupler-containing amine compounds which provide the (Coupler)–$N_2X$ compound. It is noted that these coupler-containing amino compounds generally fall into two divisions with a first division consisting of five groups and a second division consisting of four groups:

| Division | Group | Compounds |
|---|---|---|
| (1) Non-sulfonated coupler-containing amino compound. | (1) Non-sulfonated 2-hydroxynaphthoic arylamide-containing amino compound. | 2-hydroxynaphthoic(3'-amino)-anilide. |
| | | 2-hydroxynaphthoic(4'-amino)-anilide. |
| | | 2-hydroxynaphthoic (4'-amino)-o-toluidide. |
| | | 2-hydroxynaphthoic(5'-amino)-o-toluidide. |
| | | 2-hydroxynaphthoic(5'-amino)-o-anisidide. |
| | (2) Non-sulfonated 1-aryl-5-pyrazolone-containing amino compound. | 1-(m-aminophenyl)-3-methyl-5-pyrazolone. |
| | | 1-(p-aminophenyl)-3-methyl-5-pyrazolone. |
| | (3) Non-sulfonated acetoacetic arylamide-containing amino compound. | Acetoacetic(3'-amino)-anilide. |
| | | Acetoacetic(4'-amino)-anilide. |
| | | (4-amino)-N-acetoacetic phthalimide. |
| | (4) Non-sulfonated naphthol-(1)-containing amino compound. | 5-amino-naphthol-1. |
| | (5) Non-sulfonated naphthol-(2)-containing amino compound. | 7-amino-naphthol-2. |
| (2) Sulfonated coupler-containing amino compound. | (1) Sulfonated 2-hydroxynaphthoic arylamide-containing amino compound. | Sulfonated 2-hydroxynaphthoic(3'-amino)-anilide. |
| | (2) Sulfonated 1-aryl-5-pyrazolone-containing amino compound. | 1-(o-sulfo-p-amino-phenyl)-3-methyl-5-pyrazolone. |
| | (3) Sulfonated acetoacetic arylamide-containing amino compound. | Sulfonated acetoacetic(4'-amino)-anilide. |
| | (4) Sulfonated naphthol-(1)-containing amino compound. | 3-sulfo-6-amino-naphthol-1. |

The method in which a chromogen-containing amino compound is diazotized to produce a chromogen-containing diazonium salt and wherein a monomer is polymerized with such diazonium salt as a polymerization initiator to produce a chromogen-bonded-polymer has been proven to be quite convenient and efficacious, in case of the chromogen-containing amino compound having the advantageous properties of good resistance against acids, alkalis, oxidizing and reducing agents and chemicals such as homocyclic and heterocyclic compounds.

However, in such method where the chromogen in the resulting chromogen-bonded-polymer, like azo compounds, is not resistant to acids, alkalis, oxidizing and reducing agents, chemicals, etc., it may fade or be decomposed during the diazotization or the polymerization process and the desired superior color shade, transparency and physical and chemical properties will not be obtained. Moreover, in such method, to obtain a desired color shade of the chromogen-bonded-polymer, various different chromogen containing diazonium salts combinations have to be provided respectively to produce different color chromogen-bonded-polymers, such necessity introducing much complexity into their production.

However, using the method in accordance with the invention of making the coupler-bonded-polymer and then coupling the chromogen providing-diazo compound therewith to produce the chromogen-bonded-polymer, great flexibility and simplicity is afforded in selecting final color shades and physical properties thereof by providing a small number of different coupler-bonded-polymers. Furthermore, the inventive method has been shown to be quite advantageous in producing azo pigments or azo dyes. In addition, either oleophilic or hydrophilic polymers can be obtained depending upon the selection of the species of monomers comprising the polymer portions and upon the selection of the chromogen, i.e., pigment or dye type. Depending also upon the characteristics of the polymer portion, a reactive chromogen-bonded-polymer having reactive functional groups and a nonreactive chromogen-bonded-polymer having only non-reactive radicals therein are readily and freely produced.

Monomers that are addition-polymerizable and that can be used in the process of the invention are, for example, vinyl formate, vinyl acetate, vinyl chloroacetate, vinyl propionate, vinyl stearate, vinyl oleate, vinyl benzoate, vinyl chloride, vinylidene chloride, methyl vinyl ketone, styrene, methyl styrene, chlorostyrene, vinylphenol, nitrostyrene, aminostyrene, acrylic acid, methacrylic acid, crotonic acid, itaconic acid, maleic acid, fumaric acid, monomethylitaconate, monoethylitaconate, monobutylitaconate, monohexylitaconate, monomethylmaleate, monoethylmaleate, monobutylmaleate, monomethylfumarate, monoethylfumarate, monobutylfumarate, maleic anhydride, itaconic anhydride, methylacrylate, methylmethacrylate, methylcrotonate, dimethylitaconate, dimethylmaleate, dimethylfumarate, ethylacrylate, ethyl methacrylate, ethylcrotonate, diethylitaconate, diethylmaleate, diethylfumarate, propyl acrylate, propyl methacrylate, dipropylitaconate, butylacrylate, butylmethacrylate, butylcrotonate, dibutylitaconate, dibutylmaleate, dibutylfumarate, amylacrylate, amylmethacrylate, diamylitaconate, hexylacrylate, hexylmethacrylate, dihexylitaconate octylacrylate, octylmethacrylate, octylcrotonate, dioctylitaconate, dioctylmaleate, dioctylfumarate, laurylacrylate, laurylmethacrylate, laurylcrotonate, dilaurylitaconate, stearylacrylate, stearylmethacrylate, distearylitaconate,
methyl α-chloroacrylate,
ethyl-α-chloroacrylate,
ethyleneglycolmonoacrylate,
ethyleneglycolmonomethacrylate,
ethyleneglycolmonocrotonate,
ethyleneglycolmonoitaconate,
ethyleneglycoldiacrylate,
ethyleneglycoldimethacrylate,
ethyleneglycoldiitaconate,
polyethyleneglycolmonoacrylate,
polyethyleneglycolmonomethacrylate,
polyethyleneglycolmonoitaconate,
polyethyleneglycoldiacrylate,
polyethyleneglycoldimethacrylate,
propyleneglycolmonoacrylate,
propyleneglycolmonomethacrylate,
propyleneglycolmonoitaconate,
propyleneglycoldiacrylate,
propyleneglycoldimethacrylate,
polypropyleneglycolmonoacrylate,
polypropyleneglycolmonomethacrylate,
polypropyleneglycoldiacrylate,
polypropyleneglycoldimethacrylate,
propanediolmonoacrylate,
propanediolmonomethacrylate, propanedioldiacrylate,
propanedioldimethacrylate,
butanediolmonoacrylate,
butanediolmonomethacrylate,
butanedioldiacrylate,
butanedioldimethacrylate,
glycidylacrylate,
glycidylmethacrylate,
glycidylcrotonate,
monoglycidylitaconate,
monoglycidylmaleate,
monoglycidylfumarate,
diglycidylitaconate,
β-hydroxy-γ-chloro-η-propylacrylate,
β-hydroxy-γ-chloro-η-propylmethacrylate,
mono-(β-hydroxy-γ-chloro-η-propyl)-itaconate,
di-(β-hydroxy-γ-chloro-η-propyl)-itaconate,
allylacrylate,
allylmethacrylate,
N.N-di-methylaminoethylacrylate,
N.N-dimethylaminoethylmethacrylate,
acrylic chloride,
methacrylic chloride,
crotonic chloride,
itaconic chloride,
acrolein,
methacrolein,
crotonic aldehyde,
itaconic aldehyde,
acrylonitrile,
methacrylonitrile,
crotonicnitrile,
itaconic nitrile,
acrylamide,
N-methylacrylamide,
methacrylamide,
N-methylmethacrylamide,
crotonicamide,
itaconicdiamide,
itaconicmonoestermonoamide,
itaconicmonoacidmonoamide,
maleicamide,
fumaricamide,
N-methylolacrylamide,
N-methylolmethacrylamide,
N-methylolcrotonicamide,
N-methylolitaconicamide,
N.N'-dimethylolitaconicamide,
N-methylolmaleicamide,
N-methylolfumaricamide,
N-methylmethylolacrylamide,
N-methylmethylolmethacrylamide,
N-propylmethylolitaconicamide,
N-methylmethylolcrotonicamide,
N-methylmethylolitaconicamide,
N.N'-dimethylmethylolitaconicdiamide,
N-methylmethylolmaleicamide,
N-methylmethylolfumaricamide,
N-ethylmethylolacrylamide,
N-ethylmethylolmethacrylamide,
N.N'-diethylmethylolitaconicdiamide,
N-ethylmethylolitaconicmonoamide,
N-propylmethylolacrylamide,
N-propylmethylolmethacrylamide,
N-butylmethylolacrylamide,
N-butylmethylolmethacrylamide,
N-butylmethylolcrotonicamide,
N-butylmethylolitaconicmonoamide,
N.N'-dibutylmethylolitaconicdiamide,
N-butylmethylolmaleicamide,
N-butylmethylolfumaricamide,
N-sulfomethylacrylamide,
N-sulfo-methylmethacrylamide,
N-sulfomethyl-crotonic amide,
N-sulfomethylitaconicmonoamide,
N.N'-disulfomethylitaconicdiamide,
N-sulfomethylmaleicamide,
N-sulfonmethylfumaricamide,
N,N'-methylenebisacrylamide,
N.N'-methylenebismethacrylamide,
acrylicazide,
methacrylicazide,
crotonicazide,
itaconicazide,
acrylicethyleneimide,
methacrylicethyleneimide,
crotonicethyleneimide,
itaconicethyleneimide,
N-sulfoethylacrylamide,
N-sulfoethylmethacrylimide,
N-sulfoethylcrotonicamide,
N-sulfoethylitaconicimide,
N-carboxyethyleneacrylamide,
N-carboxyethylenemethacrylimide,
N-carboxyethylenecrotonicimide,
N-carboxyethyleneitaconicimide,
vinylisocyanate,
propenylisocyanate,
vinylurea,
propenylurea,
vinylphenylurethane,
propenylphenylurethane,
vinylethyleneurea,
propenylethyleneurea,
4,6-dichloro-2-vinyl-s-triazine,
4-chloro-6-amino-2-vinyl-s-triazine,
4.6-diamino-2-vinyl-s-triazine,
4.6-diethyleneimino-2-vinyl-s-triazine,
N-methylolvinylurea,
N.N-dimethylolvinylurea,
N-methylolpropenylurea,
N.N-dimethylolpropenylurea,
N.N'-dimethylol-4.6-diamino-2-vinyl-s-triazine,
N.N.N'.N'-tetramethylol-4.6-diamino-2-vinyl-s-triazine,
N-methylmethylolvinylurea,
N.N-dimethylmethylolvinylurea,
N-methylmethylolpropenylurea,
N.N-dimethylmethylolpropenylurea,
N.N'-dimethylmethylol-4.6-diamino-2-vinyl-s-triazine,
N.N.N'.N'-tetramethylmethylol-4.6-diamino-2-vinyl-s-triazine,
N-ethylmethylolvinylurea,
N.N-diethylmethylolvinylurea,
N-ethylmethylolpropenylurea,
N.N-diethylmethylolpropenylurea,
N.N'-diethylmethylol-4.6-diamino-2-vinyl-s-triazine,
N.N.N'.N'-tetraethylmethylol-4.6-diamino-2-vinyl-s-triazine,
N-propylmethylolvinylurea,
N.N'-dipropylmethylol-4.6-diamino-2-vinyl-s-triazine,
N-butylmethylolvinylurea,
N.N-dibutylmethylolvinylurea,
N-butylmethlolvinylurea,
N.N-dibutylmethylolvinylurea,
N-butylmethylolpropenylurea,
N.N-dibutylmethylolpropenylurea,
N.N'-dibutylmethylol-4.6-diamino-2-vinyl-s-triazine,
N.N.N'.N'-tetrabutylmethylol-4.6-diamino-2-vinyl-s-triazine,
N-sulfomethylvinylurea,
N.N-disulfomethylvinylurea,
N-sulfomethylpropenylurea,
N.N-disulfomethylpropenylurea,
N.N'-disulfomethyl-4.6-diamino-2-vinyl-s-triazine,
N.N.N'.N'-tetrasulfomethyl-4.6-diamino-2-vinyl-s-triazine,
N-sulfoethylvinylurea,
N-sulfoethylpropenylurea,
N.N'-disulfoethyl-4.6-diimino-2-vinyl-s-triazine, N-carboxyethylenevinylurea,
N-carboxyethylenepropenylurea,
N,N'-dicarboxy-ethylene-4,6-diimino-2-vinyl-s-triazine,
allylacetate,
allylmethylether,
allylbutylether,
allylglycidylether,
allyl-β-hydroxy-γ-chloro-η-propylether,
butadiene,
isoprene,
chloroprene,
vinylidmethylamine,
vinyldiethylamine,
vinylcarbazole,
N-vinylsuccinimide,
N-vinylphthalimide,
N-vinylcaprolactam,
N-vinylpyrrolidone,
2-vinyl-5-methylpyridine,
vinylsulfonic acid and the like.

Polymerization can be carried out by mixing one or more types of monomers without any regard to ratio of each type of monomer. The properties of the polymer portion in the coupler-bonded polymer and the chromogen-bonded-polymer are derived from those of the mixed monomers of various types, i.e., active-reactive, weakly reactive or non-reactive, or water or oil dispersible, also depending upon the ratio of each type of monomer. Such polymerization can be carried out by any of the known methods of addition-polymerization such as solution-, block-, emulsion- and suspension-polymerization.

The aforementioned addition-polymerizable monomers may be largely divided into three groups according to the reactivity of the radical of the said monomers:

(1) Active-reactive monomer group
(2) Weakly-reactive monomer group
(3) Non-reactive monomer group (1) The active-reactive monomer group is the group of addition-polymerizable monomers in which a monomer has at least one active-reactive radical in its structure and, after polymerization reaction, can provide into the coupler-bonded polymer and the chromogen-bonded-polymer radicals capable of linking with themselves and other radicals of a crosslinking agent, precondensate of thermosetting resin, reactive high polymer or reactive latex.

The following tabulation is the list of some examples of suitable active-reactive radicals:

| Names of radicals | Structure |
|---|---|
| Methylol | $-CH_2OH$ |
| Alkylmethylol | $-CH_2OR$ (R: $-CH_3$, $-C_2H_5$, $-C_3H_7$, $-C_4H_9$, etc.) |
| Sulfomethyl | $-CH_2-SO_3H$ |
| Epoxy | $-CH-CH_2$ with O bridge |
| Chlorohydrin | $-CH-CH_2$ with OH, Cl |
| Ethyleneimide | $-CON\begin{smallmatrix}CH_2\\CH_2\end{smallmatrix}$ |
| N-sulfoethyleneimide | $-CONH-CH_2-CH_2SO_3H$ |
| Ethyleneurea | $-NHCON\begin{smallmatrix}CH_2\\CH_2\end{smallmatrix}$ |
| N-sulfoethyleneurea | $-NHCONHCH_2CH_2SO_3H$ |
| Acid chloride | $-COCl$ |
| Chlorotriazine | triazine with Cl, Cl or Cl, NH_2 |

| Names of radicals | Structure |
|---|---|
| Ketene | $-CH=C=O$ |
| Aldehyde | $-CHO$ |
| Vinyl | $-CH=CH_2$ |
| Isocyanate | $-N=C=O$ |
| Acid azide | $-CON_3$ |
| Phenylurethane | $-NHCOO-\text{(phenyl)}$ | and the like.

(2) The weakly-reactive monomer group is the group of addition-polymerizable monomers in which each monomer has at least one weakly-reactive radical in its structure and, after polymerization reaction, can provide in the coupler-bonded polymer and the chromogen-bonded-polymer, radicals incapable of linking with themselves under ordinary crosslinking conditions but capable of linking with active-reactive radicals derived from other comonomers, or capable of linking with active-reactive radicals of a crosslinking agent, precondensate of a thermosetting resin, and the like, and can also provide the active-reactive radicals in the coupler-bonded polymer and the chromogen-bonded-polymer, after polymerization, by reacting with a material having at least two active-reactive radicals in its structure such as formaldehyde, glyoxal, epichlorohydrin, dichlorohydrin, cyanuric chloride, dimethylolurea, tetramethylolmelamine, hexamethylolmelamine, or precondensates of ordinary thermosetting resins and the like.

The following tabulation is the list of some examples of suitable weakly-reactive radicals:

Names of radicals:   Structure
Hydroxyl   $-OH$
Mercapto   $-SH$
Amino   $-NH_2$
Imino   $-NH-$
Carboxyl   $-COOH$
Carboamide   $-CONH_2$, $-CONH-$
Sulfonamide   $-SO_2NH_2$, $-SO_2NH-$
Urea   $-NHCONH_2$, $-NHCONH-$
Ureido   $-CONHCONH-$
Urethane   $-OCONH-$
Nitrile   $-CN$)

and the like.

(3) The non-reactive monomer group is the group of addition-polymerizable monomers in which each monomer has at least one non-reactive radical in its structure and, after polymerization reaction, can provide in the coupler-bonded polymer and the chromogen-bonded-polymer, radicals incapable of linking with themselves and other reactive radicals under ordinary crosslinking conditions.

The following tabulation is the list of some examples of suitable non-reactive radicals:

Names of radicals: Structure
Alkyl ester   $-OCOR$, $-COOR$ (R=$-C_nH_{2n+1}$ $n=1, 2, 3, 4, 5, 6, 7, 8, 9, 10, 11, 12, 13, 14, 15, 16, 17$ and $18$).
Aryl ester   $-OCOAr$, $-COOAr$ (Ar=$C_6H_5$, $-C_7H_7$ $-C_{10}H_7$).
Alicyclic   (1)
Aryl   (2)

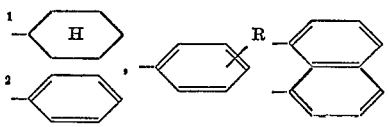

and the like.

According to the classification set forth above, the addition-polymerizable monomers which are used in the present invention are divided into groups, as follows:

(1) ACTIVE-REACTIVE MONOMER GROUP (a) Active-reactive and water-soluble or dispersible monomer group N-methylol acrylamide,
N-methylol methacrylamide,
N-methylolcrotonic amide,
N-methylol itaconic diamide,
N.N'-dimethylol itaconic amide,
N-methylol maleic amide,
N-methylol fumaric amide,
N-methylol vinyl urea,
N.N-dimethylol vinyl urea,
N.N'-dimethylol-4.6-diamino-2-vinyl-s-triazine,
N-methylmethylol acrylamide,
N-methylmethylolmethacrylamide,
N-methylmethylolcrotonic amide,
N-methylmethylol itaconic amide,
N.N'-dimethylmethylol itaconic diamide,
N-methylmethylol maleic amide,
N-methylmethylol fumaric amide,
N-methylmethylol vinyl urea,
N.N-dimethylmethylol vinyl urea,
N.N'-dimethylmethylol-4.6-diamino-2-vinyl-s-triazine,
N-ethylmethylol acrylamide,
N-ethylmethylol methacrylamide,
N-ethylmethylolcrotonic amide,
N-ethylmethylol itaconic amide,
N-ethylmethylolvinyl urea,
N.N'-diethylmethylol-4.6-diamino-2-vinyl-s-triazine, and the like,
N-propylmethylol acrylamide,
N-propylmethylol methacrylamide,
N-propylmethylol itaconic amide,
N-propylmethylol vinyl urea,
N.N'-dipropylmethylol-4.6-diamino-2-vinyl-s-triazine and the like,
N-sulfomethyl acrylamide,
N-sulfomethylmethacrylamide,
N-sulfomethyl crotonic amide,
N-sulfomethyl itaconic amide,
N-sulfomethylmaleic amide,
N-sulfomethylfumaric amide,
N-sulfomethyl vinyl urea,
N.N'-disulfomethyl-4.6-diamino-2-vinyl-s-triazine,
acrylic azide,
methacrylic azide,
N-sulfoethylacrylamide,
N-sulfoethylmethacrylimide,
N-carboxyethylacrylimide,
N-carboxyethylmethacrylimide,
acrolein and the like.

(b) Active-reactive oil-soluble or dispersible monomer group

Acrylic chloride,
methacrylic chloride,
crotonic chloride,
itaconic chloride,
maleic anhydride,
itaconic anhydride,
acrylethyleneimide,
methacrylethyleneimide,
crotonic ethyleneimide,
itaconic ethyleneimide,
N-butylmethylolacrylamide,
N-butylmethylolmethacrylamide,
N-butylmethylol vinyl urea,
N.N'-dibutylmethylol-4.6-diamino-2-vinyl-s-triazine,
glycidyl acrylate,
glycidyl methacrylate,
glycidyl crotonate,
glycidyl, itaconate,
$\beta$-hydroxy-$\gamma$-chloro-n-propylacrylate,
$\beta$-hydroxy-$\gamma$-chloro-n-propylmethacrylate,
$\beta$-hydroxy-$\gamma$-chloro-n-propyl itaconate,
ethyleneglycoldiitaconatediacid,
$\beta$-hydroxy-$\alpha$-chloro-n-propylacrylate,
allylglycidylether,
allyl $\beta$-hydroxy-$\gamma$-chloro-n-propyl ether,
vinyl isocyanate,
propenyl isocyanate,
vinyl phenylurethane,
propenyl phenyl urethane,
vinyl ethyleneurea,
propenyl ethyleneurea,
4.6-dichloro-2-vinyl-s-triazine,
4-chloro-6-amino-2-vinyl-s-triazine,
4.6-diethyleneimino-2-vinyl-s-triazine,
N.N'-methylene-bis-acrylamide,
N.N'-methylenebismethacrylamide,
methacrolein,
crotonic aldehyde,
itaconic aldehyde,
allyl acrylate,
allyl methacrylate,
ethyleneglycoldiacrylate,
ethyleneglycoldimethacrylate,
ethyleneglycoldiitaconate,
polyethyleneglycoldiacrylate,
polyethyleneglycoldimethacrylate,
propandioldiacrylate,
propanediol dimethacrylate,
polypropyleneglycoldiacrylate,
polypropyleneglycol, dimethacrylate,
butanediol diacrylate,
butanediol dimethacrylate and the like.

(2) WEAKLY-REACTIVE MONOMER GROUP (a) Weakly-reactive and water-soluble or dispersible monomer group Acrylic acid, methacrylic acid, crotonic acid, itaconic acid, maleic acid, fumaric acid, arylamide, methacrylamide, crotonic amide, itaconic diamide, itaconic monoamide, maleic diamide, maleic monoamide, fumaric amide, ethyleneglycol monoacrylate, ethyleneglycolmonomethacrylate, polyethyleneglycol monoacrylate, polyethyleneglycolmonomethacrylate, polyethyleneglycolmonoitaconatemonoamide, polyethyleneglycolmonofumarate monoamide, N-vinyl urea and the like.

(b) Weakly reactive and oil-soluble or -dispersible monomer group

Monomethylitaconate, monomethylmaleate, monoethylitaconate, monobutylitaconate, propanediolmonoacrylate, propanediolmonomethacrylate, propanediolmonoitaconate, propanediolmonomaleate, polypropyleneglycolmonoacrylate, polypropyleneglycolmonomethacrylate, butanediolmonoacrylate, butanediolmonomethacrylate, butanediolmonoitaconate and the like.

(3) NON-REACTIVE MONOMER GROUP (a) Non-reactive and water-soluble or -dispersible monomer group N-vinyl pyrrolidone, 2-vinyl-5-methyl pyridine.

(b) Nono-reactive and oil-soluble or -dispersible monomer group

Methylacrylate, methylmethacrylate, methylcrotonate, dimethylitaconate, dimethylmaleate, dimethylfumarate, ethylacrylate, ethylmethacrylate, ethylcrotonate, diethylitaconate, diethylmaleate, diethylfumarate, propylacrylate, propylmethacrylate, dipropylitaconate, butylacrylate, butylmethacrylate, dibutylitaconate, dibutylmaleate, dibutylfumarate, hexylacrylate, hexylmethacrylate, dihexylitaconate, octylacrylate, octylmethacrylate, octylcrotonate, dioctylitaconate, dioctylmaleate, dioctylfumarate, laurylacrylate, laurylmethacrylate, dilaurylitaconate, stearylacrylate, stearylmethacrylate, disterylitaconate acrylonitrile, methacrylonitrile crotoniconitrile, itaconiconitrile vinyl acetate, vinyl propionate, vinyl stearate, styrene, vinyl toluene, vinyl chloride, vinylidene chloride, methyl vinyl ketone, N-vinyl-ε-caprolactum, N-vinylphthalimide, butadiene, isoprene and chloroprene.

The chromogen-bonded-polymer produced with the use of an addition-polymerizable monomer belonging to the active-reactive monomer group or the weakly-reactive monomer group can be reacted with a compound which, when reacted with the polymer, provides active-reactive radicals for the polymer to produce the chromogen-bonded-polymer having active-reactive radicals in its structure.

Such compounds are, for example, formaldehyde, dimethylol urea, trimethylolurea, tetramethylol urea, dimethylol melamine, trimethylol melamine, tetramethylol melamine, pentamethylol melamine, hexamethylol melamine, dialkylmethylol urea, trialkylmethylol urea, tetraalkylmethylol urea, dialkylmethylol melamine, trialkylmethylol melamine, tetraalkylmethylol melamine, pentaalkylmethylol melamine, hexaalkylmethylol melamine, epichlorohydrin, dichlorohydrin, ethyleneimine and the like.

If the polymer contains the aforementioned reactive radicals, which are in themselves solubilizable or dispersible, then a solubilizable or dispersible radical need not be included. For a hydrophilic radical solubilizable or dispersible in water, at least one polar radical is properly selected from anionic, nonionic and cationic hydrophilic radicals according to the object to be performed by coloring matter. As typical thereof, there can be enumerated such anionic hydrophilic radicals as carboxyl (—COOH), sulfate (—OSO$_3$H) and sulfo (—SO$_3$H) radicals, such nonionic hydrophilic radicals as hydroxyl (—OH), ether (—O—) and carboamide (—CONH$_2$) radicals and such cationic hydrophilic radicals as amino (—NH$_2$), imino (—NH—), tertiary amino

and pyridinium

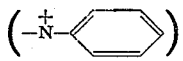

radicals. For a hydrophobic radical solubilizable or dispersible in oil there is properly selected at least one nonpolar group from aliphatic hydrocarbon radicals having 2 to 18 carbon atoms, aromatic and cyclohydrocarbon radicals and esters, ether, carboamide, sulfoamide, urea and urethane condensates thereof according to the use desired of the aforesaid coloring matter.

Processes in accordance with the invention for making a coupler-bonded polymer and a chromogen-bonded-polymer having a hydrophilic or hydrophobic radical may include the following:

(1) Introduction of water-solubilizable or dispersible radicals.
 (A) Introduction of anionic hydrophilic radicals.
  (a) A carboxyl radical is introduced by using chloroacetic acid.
  (b) A sulfo radical is introduced by using sodium bisulfite.
  (c) A sulfo radical is introduced by using sulfamic acid.
 (B) Introduction of nonionic hydrophilic radicals.
  (a) A polyether type radical is introduced by using ethyleneoxide.
  (b) A polyalcohol type radical is introduced by using glycerine or glycidol.

(C) Introduction of cationic hydrophilic radicals.
 (a) An amino or imino radical is introduced by using a lower amine.
 (b) A pyridinium radical is introduced by using pyridine hydrochloride.
 (c) An imino radical is introduced by using ethylene imine.

(2) Introduction of oil-solubilizable or dispersible radicals.

By using a reactive compound having such hydrophobic hydrocarbon radical as, for example, a higher aliphatic, or aromatic-amine, -alcohol, -carboamide, -methylol carboamide, -isocyanate, -urea, -urethane or -ethylene urea or a phenolic derivative, the aforesaid hydrocarbon radical is introduced.

The introduction of the solubilizable or dispersible radical into the coupler-bonded-polymer and the chromogen-bonded-polymer enables it to be used in many different ways depending upon the nature of the radical introduced thereinto.

The coupler-bonded-polymer and the chromogen-bonded-polymer of the present invention can be utilized for different uses depending on the kind of the solubilizable or dispersible radical contained therein, i.e., the coupler-bonded-polymer and the chromogen-bonded-polymer into which there is introduced a hydrophilic radical can be extensively utilized as a material similar to a dye in such conventional uses of dyes as dyeing fibrous materials. The polymer into which there is introduced a hydrophobic radical can be also extensively utilized, as a coloring material for paints and printing inks in the conventional uses of pigments.

This is because the coupler-bonded-polymer and the chromogen-bonded-polymer of the invention, having in its structure radicals solubilizable or dispersible respectively in water, organic solvents, plasticizers or and other vehicles, can be easily dissolved or finely dispersed in such vehicles by merely being mixed and stirred therein. In the case of a coupler-bonded-polymer and a chromogen-bonded-polymer having reactive radicals in its structure, when an after-treatment such as heating, addition of a catalyst or a heavy metal or variation of pH is then carried out, the reactive (functional) radicals of the coupler-bonded-polymer and the chromogen-bonded-polymer will be made to react with each other or with the vehicle so that the polymer may be crosslinked to be of a higher molecular weight. Thus, its resulting solubilizability or dispersibility will be so negligible as compared with the molecular weight of such crosslinked polymer that effectively it will be rendered insoluble.

Where the coloring agent provided in accordance with this invention is employed for ball-point pen ink, stamp pad ink, cosmetics and soap, such agent will be stable for a long storage period and its solubility is quite high if the chromogen-bonded-polymer constituting it has weakly-reactive and/or non-reactive radicals, or even more preferably, only non-reactive radicals in its structure. Useful chromogen-bonded-polymers will be produced by utilizing the properties of solubilizable radicals of addition-polymerizable monomers.

For example, a coloring agent for the ball-point pen ink is required to have high solubility and low bleeding in fatty oils.

Thus, for example, in a polymethyl methacrylate polymer formed by using methyl methacrylate as the addition polymerizable monomer, such cromogen-bonded-polymer will be soluble in esters, ketones, benzyl alcohol, etc., and will not bleed in fatty oil. Such advantageous properties are not possessed by any oil-soluble dye.

As for a coloring agent for the inner coloring of a synthetic resin and a synthetic fiber, if there is selected an addition-polymerizable monomer which will result in a coupler-bonded polymer and a chromogen-bonded-polymer having properties of which are the same as those of the resin or fiber, or which has affinity therewith, then their physical and chemical properties coincide to some extent. In such case, when it is desired to color such synthetic resin or fiber, they will not be destroyed or injured in the coloring thereof.

As an example of the latter, if a coupler-bonded polymer and a chromogen-bonded-polymer, the polymer portion of which is polyacrylonitrile, is selected for the dope dyeing of polyacrylonitrile, a colored yarn will be obtained without changing the conditions of spinning.

The effects of coloring articles and materials with the coupler-bonded polymer and chromogen-bonded-polymer having solubilizable or dispersible radicals as compared with those of conventional dyes and pigments is explained as follows:

The chromogen-bonded-polymers which have radicals solubilizable or dispersible in oil, for example, have such high dispersibility in solvents and varnishes that when they are utilized as a paint or ink, for example, they will be transparent, high in concentration and have good spreadibility. If the chromogen-bonded-polymers also have the aforesaid reactive radicals, the latter will crosslink to each other or to a functional radical of an article being coated with the chromogen-bonded-polymer upon an after-treatment of the coated article. If the chromogen-bonded-polymer is used to color the interiors of synthetic resins and synthetic fibers and a dispersible radical high in compatibility with the resins and/or fibers is present in the chromogen-bonded-polymer, the latter chromogen-bonded-polymer will be high in dispersibility and tinting strength, will cause no migration and will not deleteriously reduce the normal physical and electrical characteristics of such resins and fibers.

In coloring with conventional water-soluble coloring material such as known reactive dyes, the chromogens in these dyes are generally chosen to have a functional radical which is believed to covalently bond with a functional radical of the material, such as a fibrous substance, to be bonded to color the material. In this situation, a reactive dye which has been hydrolyzed with the water medium or a reactive dye which has lost its functional radicals through reaction with a sizing material, for example, will no longer be able to react with the material to be colored thereby reducing fastness of color. Furthermore, conventional dyes having a radical such as a sulfo or carboxyl radical in its chromogen, if not sufficiently applied to fabric materials, for example, will again dissolve or disperse in water when the dyed materials are washed and will stain white and light colored portions of the material. Even where sufficient dye has been applied, variations in pH or other conditions may result in a varying of the hue.

By contrast, when the chromogen-bonded-polymer produced in accordance with the invention has present therein reactive radicals and a radical solubilizable or dispersible in water and such chromogen-bonded-polymer is caused to permeate materials such as fibrous materials in a state having affinity with water and then the reactive radicals are caused to crosslink with each other or to react with the functional radical or radicals of the materials in an after-treatment of the materials coated with the chromogen-bonded-polymer such as by heating or pH variation, etc., the chromogen-bonded-polymer will readily be crosslinked to a higher polymer. The resulting higher polymer is necessarily so insoluble and stable within the coated materials, that, even if the materials are washed with hot water, acid or alkali, the color on the material remains fast. Thus, it has been found that the crosslinked chromogen-bonded-polymer produced by the after-treatment is so high in its fixing ratio, abrasion resistance and other characteristics of fastness that not only cotton, and other cellulose fibers such as viscose rayon and acetate rayon fibers but also wool and such synthetic fibers as polyester, polyamide, polyacrylonitrile and polyvinyl formal fibers can be uniformly dyed with it.

Where solutions for producing fibers, papers and non-woven fabrics are colored with a conventional coloring material, dye, etc., the coloring material will act as an impurity and will deleteriously affect physical properties of the colored objects by reducing, for example, their tensile strength and tearing, bending and brasion resistance. By contrast, the chromogen-bonded-polymer of the invention ehances such properties.

In addition, it has been found that when materials and articles such as papers, textiles, leathers, wooden articles, hard boards, concrete walls, metal plates, glass plates and the like are colored with the chromogen-bonded-polymer of the invention while simultaneously being resin treated, they are advantageously endowed with the desirable property of proof against stain and water, fire and moth damage.

This invention also provides two useful methods for coloring articles such as fibers, textiles, papers, non-woven fabrics, leather and the like by using the coupler-bonded-polymers as mentioned hereinbelow. One method consists of treating the article in a bath containing a coupler-bonded-polymer and developing the treated article by coupling with a diazonium component. Another method consists of mixing a coupler-bonded-polymer with a stabilized diazo component to make a printing paste, printing the article with such printing paste and developing by an after-treatment such as an acidic steaming to effect the coupling of the coupler portion of the coupler-bonded-polymer with the diazo component.

The following examples will serve to illustrate the invention. However, it is to be understood that it is not intended to limit the scope of the invention thereto. The word "parts" appearing in the examples is intended to signify parts by weight.

EXAMPLE 1

A quantity of 5 parts of 2-hydroxynaphthoic (3'-amino)-anilide was added to 300 parts of 5% aqueous solution of hydrochloric acid. The dispersion was cooled to 0–3° C., 11.7 parts of an aqueous solution of sodium nitrite containing 1.7 parts of sodium nitrite were gradually added thereto and a diazotization reaction was carried out for 40 minutes. After such diazotization, the resulting solution was filtered at 1–3° C. 20 parts of a 25% aqueous solution of zinc chloride were cooled to 1–3° C. and gradually added to the filtrate to precipitate the stabilized diazonium salt of 2-hydroxynaphthoic anilide and the precipate was removed by filtration.

The filter cake containing the stabilized diazonium salt was mixed with 10 parts of acrylamide and 150 parts of ice water. The mixture was stirred, and 50 parts of an aqueous solution of titanium trichloride containing 7 parts of a 17% aqueous solution of titanium trichloride were added to the mixture while it was being stirred. Foaming occurred and the temperature rose to about 20° C. The polymerization reaction was continued for 2 hours at the latter temperature and for 3 hours at 40° C.

After polymerization, the solution was poured into 1,500 parts of methyl alcohol to precipitate the 2-hydroxynaphthoic anilide-bonded-polymer. The precipitate was filtered and washed with methyl alcohol.

The filter cake was dissolved in water to make a 5% aqueous solution of the coupler-bonded-polymer and the pH of the solution was adjusted to 9 with a dilute solution of sodium hydroxide. 100 parts of coupler-bonded-polymer solution was coupled with the diazotized 3-amino-4-methoxybenzamide to form a chromogen-bonded-polymer.

After the coupling reaction, 1,000 parts of methyl alcohol were added to precipitate the chromogen-bonded-polymer. The precipitate was filtered, washed with 50 parts of methyl alcohol and dried in open air.

EXAMPLE 2

A quantity of 5 parts of the polymer powder which was synthesized according to the method described in Example 1 was dissolved in 95 parts of water to make an aqueous solution. 3 parts of 37% aqueous solution of formaldehyde were added to the solution and methylolation was carried out at 65° C. for 25 minutes under the condition of pH 9 which was regulated by adding 5% aqueous sodium carbonate solution.

With the adding of 300 parts of methanol, a chromogen-bonded-polymer was obtained. This polymer was dried in open air to obtain polymer powder. The polymer powder was quite soluble in water and clear aqueous solution was obtained.

EXAMPLE 3

A quantity of 3 parts of unmethylolated chromogen-bonded-polymer synthesized acording to the method described in Example 1 were dissolved in 97 parts of water to make an aqueous solution thereof. A quantity of 0.5 part of melamine and 5.4 parts of 37% aqueous solution of formaldehyde was added to the solution. The pH of the solution was regulated to 7.5 by the addition of 5% aqueous sodium carbonate solution. Clear solution was obtained by then heating at 70° C. for 10 minutes.

After cooling the solution down to 45° C., 0.2 part of sulfamic acid and 2.0 parts of 30% aqueous hydrochloric acid solution were added together to the above solution, and then by lowering the pH of the solution to 4.5, condensation occurred. After about 10 minutes, by taking a drop of reactant solution, the condensation degree was detected by dropping it into a large quantity of cold water and checking the point where a resinous precipitate would be formed.

Then 0.8 part of 20% aqueous sodium hydroxide solution was added to the solution which made the pH of the reactant about 10, at which point chromogen-bonded-polymer solution was obtained. At this stage no precipitation could be detected when one drop of reactant was dropped into a large amount of cool water.

To a chromogen-bonded-polymer solution which was synthesized according to the method described in this example, three times its volume of methanol was added, whereby chromogen-bonded-polymer precipitate was obtained. This polymer precipitate was dissolved in sufficient water to dilute it to 5% by weight in aqueous solution.

According to the following composition, emulsion-polymerization was carried out at 55° C. for 1 hour, 65° C. for 4 hours, and 80° C. for 2 hours, with a continuous agitation and heating, and colored latex was obtained thereby.

| | Parts |
|---|---|
| Chromogen-bonded-polymer solution | 75.0 |
| Butyl acrylate | 9.5 |
| Vinyl acetate | 1.5 |
| Vinylidene chloride | 9.0 |
| Acrylamide | 0.2 |
| Sodium phosphate | 0.5 |
| Sodium alkyl benzene sulfonate | 0.5 |
| Potassium persulfate | 0.04 |
| Water | 3.76 |
| Total | 100.00 |

Similar colored latex was also obtained by using the chromogen-bonded-polymer solution prepared according to Example 2.

This example shows the production of a chromogen-bonded-polymer which is both methylolated to be reactive and has introduced thereinto a water solubilizable sulfo radical by the use of sulfamic acid. In addition, it illustrates the production of a colored latex comprising mixing a reactive solubilizable chromogen-bonded-polymer with addition-polymerizable monomers and a polymerization initiator, and polymerizing these monomers in an aqueous solution of the chromogen-bonded-polymer.

EXAMPLE 4

A quantity of 5 parts of unmethylolated chromogen-bonded-polymer which was synthesized according to the method described in Example 1 was dissolved in 95 parts of water to give a chromogen-bonded-polymer aqueous solution. 10 parts of melamine and 43 parts of 37% aqueous solution of formaldehyde were added to the colored solution. Methylolation reaction was carried out at 70° C. after the pH of the reactant was regulated with 5% aqueous sodium carbonate solution to 7.5. After complete dissolution was achieved by the addition of 50 parts of butanol and 1 part of phosphoric acid, a dehydration reaction was carried out at 90° C. by circulating the butanol only from the mixture of the butanol and water, which was stripped off and collected from the reactant. After the reaction was completed, by taking off the excess butanol under reduced pressure, and by concentrating the reactant to a viscous solution containing 50% of solid content, butyl-methylol-melamine type resinous solution was obtained.

EXAMPLE 5

2-hydroxynaphthoic (5'-amino) - O - toluidide hydrochloride was diazotized and stabilized using zinc chloride according to the method described in Example 1.

A mixture was then formulated as follows:

| | Parts |
|---|---|
| A 15% paste containing the thus obtained stabilized diazonium salt | 20 |
| N-methylmethyol acrylamide | 7 |
| 17% aqueous solution of titanium trichloride | 7 |
| Water | 66 |
| | 100 |

The polymerization was carried out according to the method described in Example 1.

After polymerization, 500 parts of methyl alcohol were added to precipitate the coupler-bonded-polymer. After filtering, a chromogen-bonded-polymer was prepared by coupling the above-obtained 2-hydroxynaphthoic-O-toluidide-bonded-polymer with diazotized O-nitro-p-chloroaniline in aqueous medium containing sodium hydroxide. Thereafter, 1,000 parts of methyl alcohol were added to precipitate the chromogen-bonded-polymer which was obtained by filtering and washing.

EXAMPLE 6

A quantity of 5 parts of 2-hydroxynaphthoic - (4'-amino)-anilide was added to 40 parts of 98% sulfuric acid. After the solution was cooled to 0°–5° C., 2.6 parts of sodium nitrile were gradually added to the solution and a diazotization reaction was carried out for 30 minutes. After diazotization reaction was carried out for 30 minutes. After diazotization, the diazotized solution was poured into 400 parts of ice water and, then, excess nitrous acid was decomposed with sulfamic acid using potassium iodide starch paper. Thereafter, the obtained dispersion was filtered at 1–5° C. The filter cake obtained thereby was mixed with 100 parts of water and deflocculated with stirring. 40 parts of 25% aqueous solution of sodium poly (dinaphthylmethanedisulfonate) were cooled to 1–5° C. and gradually added to the dispersion to make an aqueous solution of the stabilized diazonium salt.

A quantity of 7.5 parts of acrylamide, 1.1 parts of methylacrylate and 0.5 part of copper were added to the above obtained solution. A polymerization was carried out according to the method described in Example 1.

After polymerization, the pH of the solution was adjusted to 9 and coupled with diazotized 2.5-dichloroaniline to form the chromogen-bonded-polymer. After such coupling, the solution was poured into 600 parts of methyl alcohol to precipitate the chromogen-bonded-polymer. The precipitate was filtered, washed with methyl alcohol and dried in open air.

The chromogen-bonded-polymer thus obtained was methylolated according to the method described in Example 2.

EXAMPLE 7

2 - hydroxynaphthoic - (3'-amino)-anilide hydrochloride was diazotized and stabilized using zinc chloride according to the method described in Example 1.

A mixture was then formulated as follows:

| | Parts |
|---|---|
| A 15% paste containing the thus obtained stabilized diazonium salt | 20 |
| Acrylamide | 7 |
| Glycidyl acrylate | 1 |
| Sodium alkylbenzenesulfonate | 0.1 |
| Water | 71.9 |
| Total | 100 |

The polymerization was carried out at 60° C. for 1 hour.

After polymerization, the 2-hydroxynaphthoic-anilide-bonded-polymer was coupled with the diazotized p-nitro aniline to form the chromogen-bonded-polymer. Thereafter, 300 parts of methyl alcohol and 2 parts of sodium chloride were added to precipitate the chromogen-bonded-polymer. The precipitate was filtered and washed with 50 parts of methyl alcohol to obtain the chormogen-bonded-polymer.

EXAMPLE 8

Sulfonated 2-hydroxynaphthoic-(3'-amino)-anilide was diazotized and stabilized using zinc chloride according to the method described in Example 1.

A mixture was then formulated as follows:

| | Parts |
|---|---|
| A 15% paste containing the thus obtained stabilized diazonium salt | 20 |
| N-(Sulfomethyl) acrylamide | 2 |
| Ethyleneglycolmonoacrylate | 6 |
| 17% aqueous solution of titanium trichloride | 6 |
| Water | 66 |
| Total | 100 |

The polymerization was carried out according to the method described in Example 1.

After polymerization, the obtained sulfonated 2-hydroxynaphthoic anilide-bonded-polymer was coupled with diazotized p-chloro-O-toluidine to form the chromogen-bonded-polymer. Then, 300 parts of acetone and 3 parts of sodium chloride were added to precipitate the chromogen-bonded-polymer. The precipitate was filtered and washed with 50 parts of acetone to obtain the chromogen-bonded-polymer.

EXAMPLE 9

2-hydroxynaphthoic-(3'-amino) anilide hydrochloride was diazotized and stabilized using sodium dodecylbenzenesulfonate instead of zinc chloride according to the method described in Example 1.

A mixture was then formulated as follows:

| | Parts |
|---|---|
| A 15% paste containing the thus obtained stabilized diazonium salt | 30 |
| Methyl methacrylate | 9 |
| Glycidyl methacrylate | 0.3 |
| Phenylhydrazine hydrochloric acid salt | 1.0 |
| Cyclohexanone | 59.7 |
| Total | 100 |

The polymerization was carried out according to the method described in Example 1.

After polymerization, 500 parts of methyl alcohol were added to precipitate the coupler-bonded-polymer. After filtration, the precipitate was dissolved in 100 parts of mixed solvent consisting of methyl alcohol and 20% aqueous solution of sodium hydroxide. The coupler-bonded-polymer solution was then divided into three portions.

One portion of the 2-hydroxynaphthoic anilide-bonded-polymer solution was coupled with the diazotized p-chloro-O-toluidine. A second portion was coupled with diazotized.

1-aminoanthraquinone to form the chromogen-bonded-polymer. The third portion was coupled with the mixed diazonium component consisting of diazotized p-chloro-O-toluidine and diazotized 1-aminoanthraquinone to form the chromogen-bonded-polymer.

After filtration, chromogen-bonded-polymers of different color shades were obtained from the first, second and third portions, respectively.

EXAMPLE 10

2 - hydroxynaphthoic - (4'-amino)-O-toluidide hydrochloride was diazotized and stabilized using sodium lauryl sulfate instead of zinc chloride according to the method described in Example 1.

A mixture was then formulated as follows:

| | Parts |
|---|---|
| A 15% paste containing the thus obtained stabilized diazonium salt | 20 |
| Glycidyl acrylate | 10 |
| Pyrogallol | 0.7 |
| Water | 69.3 |
| Total | 100 |

The polymerization was carried out according to the method described in Example 1.

After polymerization, the precipitated coupler-bonded-polymer was filtered and washed with dilute aqueous solution of sodium hydroxide and finely dispersed with strong agitation in water-methanol solution containing sodium hydroxide.

Thereafter, the obtained 2-hydroxy-naphthoic-O-toluidide-bonded-polymer was coupled with the diazotized 1-amino-anthraquinone to form the chromogen-bonded-polymer. After such coupling, the obtained chromogen-bonded-polymer was filtered and washed with 50 parts of methyl alcohol and dried in open air.

EXAMPLE 11

2 - hydroxynaphthoic - (3'-amino)-anilide hydrochloride was diazotized and stabilized using sodium borofluoride instead of zinc chloride according to the method described in Example 1.

A mixture was then formulated as follows:

| | Parts |
|---|---|
| A 2% aqueous solution of the stabilized diazonium salt | 82.5 |
| Glycidyl methacrylate | 2 |
| Monoglycidylmonobutylitaconate | 1 |
| Butyl acrylate | 10 |
| 10% aqueous solution of sodium sulfide | 4 |
| Sodium alkylbenzenesulfonate | 0.5 |
| Total | 100 |

The polymerization was carried out according to the method described in Example 1.

After polymerization, 20 parts of 10% aqueous solution of sodium carbonate were added to the thus-obtained coupler-bonded-polymer latex. Thereafter, the 2-hydroxy-naphthoic-anilide-bonded-polymer was coupled with the diazotized 2-ethyl sulfonyl-5-trifluoromethylaniline to obtain the chromogen-bonded-polymer. After coupling, 10 parts of sodium sulfate and 100 parts of methyl alcohol were added to precipitate the chromogen-bonded-polymer. The precipitate was filtered and washed with 50 parts of methyl alcohol to obtain the chromogen-bonded-polymer.

EXAMPLE 12

Acetoacetic-(3'-amino) anilide hydrochloride was diazotized and stabilized using N-methyl taurine instead of zinc chloride according to the method described in Example 1.

A mixture was then formulated as follows:

|  | Parts |
|---|---|
| A 15% paste containing the thus obtained stabilized diazo compound | 20 |
| Glycidyl acrylate | 7 |
| Ethyleneglycolmonoacrylate | 1 |
| Polyethyleneglycolalkylether | 1 |
| 17% aqueous solution of titanium trichloride | 62 |
| Water | 62 |
| Total | 100 |

The polymerization was carried out according to the method described in Example 1.

After polymerization, the obtained acetoacetic anilide-bonded-polymer was coupled with diazotized o-chloro-aniline to form the chromogen-bonded-polymer. After coupling, 300 parts of methyl alcohol were added to precipitate the chromogen-bonded-polymer and the precipitate was filtered, washed with 100 parts of water and 50 parts of methyl alcohol and dried in open air to obtain the chromogen-bonded-polymer powder.

EXAMPLE 13

2 - hydroxynapthhoic - (5' - amino)-O-anisidide hydrochloride was diazotized and stabilized using zinc chloride according to the method described in Example 1.

A mixture was then formulated as follows:

|  | Parts |
|---|---|
| A 15% paste containing the thus obtained stabilized diazonium salt | 25 |
| Dilaurylitaconate | 10 |
| Octyl acrylate | 1 |
| 4.6 - bis(N - butylmethylolamine) - 2 - vinyl-s-triazine | 0.5 |
| Sodium alkylaryl sulfonate | 0.5 |
| 10% aqueous solution of sodium sulfide | 7 |
| Copper | 0.1 |
| Water | 55.9 |
| Total | 100 |

The polymerization was carried out according to the method described in Example 1.

After polymerization, 300 parts of methyl alcohol and 1 part of sodium sulfate were added with strong agitation to precipitate the 2 - hydroxynaphthoic - O-anisidide-bonded-polymer. After filtration, the filtered 2-hydroxynaphthoic-O-anisidide-bonded-polymer was dissolved in 150 parts of acetone. The resulting acetone solution was poured into 100 parts of 10% aqueous solution of sodium hydroxide.

The chromogen-bonded-polymer was prepared by coupling the above-obtained 2-hydroxynaphthoic-O-anisidide-bonded-polymer with the diazotized 2-aminodiphenyl. After complete coupling, the chromogen-bonded-polymer was precipitated by the adding of 2,000 parts of water and .5 part of sodium sulfate. After filtering and washing with water, the chromogen-bonded-polymer was obtained.

EXAMPLE 14

Acetoacetic-(3'-amino) anilide hydrochloride was diazotized and stabilized using stannic chloride instead of zinc chloride according to the method described in Example 1.

A mixture was then formulated as follows:

|  | Parts |
|---|---|
| A 15% paste containing the thus obtained stabilized diazonium salt | 20 |
| Acrylic acid | 5 |
| Methyl acrylate | 1 |
| Aqueous solution of sodium hypophosphite (10%) | 9 |
| Water | 65 |
| Total | 100 |

The polymerization was carried out according to the method described in Example 1.

After polymerization, the obtained coupler-bonded-polymer was neutralized and coupled with the diazotized O-nitro-aniline to form the chromogen-bonded-polymer.

EXAMPLE 15

Sulfonated acetoacetic-(4-amino) anilide was diazotized and stabilized using zinc chloride according to the method described in Example 1.

A mixture was then formulated as follows:

|  | Parts |
|---|---|
| A 15% paste containing the thus obtained stabilized diazonium salt | 20 |
| Acrylic acid | 6 |
| Water | 74 |
| Total | 100 |

The polymerization was carried out according to the method described in Example 7.

After polymerization, the obtained coupler-bonded-polymer was neutralized and coupled with the diazotized m-nitro-aniline to form the chromogen-bonded-polymer. After the pH was adjusted to 9 with 10% aqueous solution of sodium carbonate, 400 parts of methyl alcohol were added to precipitate the chromogen-bounded-polymer. The precipitate was filtered and washed with 50 parts of methyl alcohol to obtain the chromogen-bonded-polymer.

A chromogen-bonded-polymer was also prepared by using 1 - (o - sulfo - p-aminophenyl)-3-methyl-5-pyrazolone instead of above sulfonated acetoacetic-(4-amino)-anilide according to the method of this example.

EXAMPLE 16

2 - hydroxynaphthoic - (3'-amino) anilide hydrochloride was diazotized and stabilized using zinc chloride according to the method described in Example 7.

A mixture was then formulated as follows:

|  | Parts |
|---|---|
| A 15% paste containing the thus obtained stabilized diazonium salt | 25 |
| Acrylamide | 8 |
| Itaconic amide | 2 |
| Water | 65 |
| Total | 100 |

The polymerization was carried out according to the method described in Example 7.

After polymerization, chromogen-bonded-polymer was prepared by coupling the above-obtained 2-hydroxynaphthoic anilide-bonded-polymer with the diazotized 4-chloro-2-anisidine.

EXAMPLE 17

Aceto-acetic-(4-amino)-anilide hydrochloride was diazotized and stabilized using zinc chloride according to the method described in Example 1.

A mixture was then formulated as follows:

| | Parts |
|---|---|
| A 15% paste containing the thus obtained stabilized diazonium salt | 25 |
| Ethyleneglycolmonoacrylate | 6 |
| Methyl acrylate | 1 |
| 10% aqueous solution of sodium bisulfite | 13 |
| Copper | 0.13 |
| Water | 54.87 |
| Total | 100 |

The polymerization was carried out according to the method described in Example 1.

The resulting coupler-bonded-polymer was coupled with the diazotized O-nitro-p-anisidine to prepare the chromogen-bonded-polymer.

EXAMPLE 18

(4-amino) - N - acetoacetic phthalimide hydrochloride was diazotized and stabilized using zinc chloride according to the method described in Example 1.

A mixture was then formulated as follows:

| | Parts |
|---|---|
| A 15% paste containing the thus obtained stabilized diazonium salt | 30 |
| Methyl methacrylate | 10 |
| Polyethyleneglycolalkylether | 0.5 |
| Phenylhydrazine hydrochloric and salt | 1.9 |
| Water | 57.6 |
| Total | 100 |

The polymerization was carried out according to the method described in Example 1.

After polymerization, the thus-obtained N-acetoacetic phthalimide-bonded-polymer was coupled with the diazotized O-nitro-p-chloro-aniline to form the chromogen-bonded-polymer. After filtering and washing with 50 parts of water, the chromogen-bonded-polymer was obtained.

EXAMPLE 19

2 - hydroxynaphthoic-(3'-amino)-anilide hydrochloride was diazotized and stabilized using sodium naphthalene-1.5-disulfonate instead of zinc chloride according to the method described in Example 1.

A mixture was then formulated as follows:

| | Parts |
|---|---|
| A 15% paste containing the thus obtained stabilized diazonium salt | 20 |
| Acrylonitrile | 8 |
| Ethyl acrylate | 1 |
| Polyethyleneglycolalkylphenylether | 0.5 |
| Sodium alkylbenzenesulfonate | 0.2 |
| Phenylhydrazine hydrochloric acid salt | 0.75 |
| Copper | 0.08 |
| Water | 69.47 |
| Total | 100.0 |

The polymerization was carried out according to the method described in Example 1.

After polymerization, the obtained latex containing 2-hydroxynaphthoic anilide-bonded-polymer was coupled with the diazotized 4-chloro-6-benzamido-m-anisidine to form the chromogen bonded-polymer.

EXAMPLE 20

5-amino-naphthol-(1) hydrochloride was diazotized and stabilized using zinc chloride according to the method described in Example 1.

A mixture was then formulated as follows:

| | Parts |
|---|---|
| A 15% paste containing the thus obtained stabilized diazonium salt | 30 |
| Methacrylic acid | 10 |
| Water | 60 |
| Total | 100 |

The polymerization was carried out according to the method described in Example 7.

After polymerization, the pH was adjusted to 9 with 10% aqueous solution of sodium carbonate and 500 parts of methyl alcohol were added to precipitate the naphthol-(1)-bonded-polymer. The precipitate was filtered and the resulting naphthol-(1)-bonded-polymer was dissolved in water and coupled with the diazotized aniline-p-sulfonic acid to form the chromogen-bonded-polymer.

EXAMPLE 21

3-sulfo-6-amino-naphthol-1 was diazotized and stabilized using zinc chloride according to the method described in Example 1.

A mixture was then formulated as follows:

| | Parts |
|---|---|
| A 15% paste containing the thus obtained stabilized diazonium salt | 25 |
| Acrylamide | 8 |
| Methyl acrylate | 1 |
| Water | 66 |
| Total | 100 |

The polymerization was carried out according to the method described in Example 7.

After polymerization, the coupler-bonded-polymer was precipitated by adding 300 parts of acetone and 2 parts of sodium sulfate. After filtration, 3-sulfonaphthol-(1)-bonded-polymer was coupled with the diazotized compound of the amino compound which had the following structure:

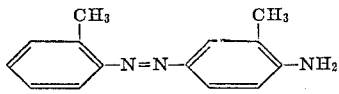

After coupling, the chromogen-bonded-polymer was obtained.

EXAMPLE 22

7-amino-naphthol-(2)hydrochloride was diazotized and stabilized using stannic chloride istead of zinc chloride according to the method described in Example 1.

A mixture was then formulated as follows:

| | Parts |
|---|---|
| A 15% paste containing the thus obtained stabilized diazonium salt | 30 |
| Methyl methacrylate | 10 |
| Sodium alkylarylsulfonate | 0.5 |
| 10% aqueous solution of sodium sulfide | 13 |
| Copper | 0.13 |
| Water | 46.37 |
| Total | 100 |

The polymerization was carried out according to the method described in Example 1.

After polymerization, the obtained latex containing the coupler-bonder-polymer was divided into three portions; one portion of latex containing naphthol-(2)-bonded-polymer was coupled with the diazotized o-chloroaniline, a second portion was coupled with the diazotized p-chloro-o-toluidine to obtain the chromogen-bonded-polymers, and the third portion was coupled with the mixed diazonium component comprising the diazotized o-chloro-aniline and the diazotized p-chloro-o-toluidine to obtain the chromogen-bonded-polymer.

EXAMPLE 23

1-(p-amino) - phenyl-3-methyl-5-pyrazolone was diazotized and stabilized using zinc chloride according to the method described in Example 1.

A mixture was then formulated as follows:

| | Parts |
|---|---|
| A 15% paste containing the thus obtained stabilized diazonium salt | 30 |
| Ethyleneglycolmonomethacrylate | 6 |
| 2-vinyl-5-methyl pyridine | 1 |
| Methyl acrylate | 3 |
| Water | 60 |
| Total | 100 |

The polymerization was carried out according to the method described in Example 7. After polymeriztaion, the resulting 1 - phenyl-3-methyl-5-pyrazolone-bonded-polymer solution was coupled with the diazotized 2.5-dichloroaniline to form the chromogen-bonded-polymer.

EXAMPLE 24

2-hydroxynaphthoic-(3'-amino)-anilide was diazotized and stabilized using zinc chloride according to the method described in Example 1.

A mixture was then formulated as follows:

| | Parts |
|---|---|
| A 15% paste containing the thus obtained stabilized diazonium salt | 20 |
| Monomethyl itaconate monoacid | 3 |
| Methacrylamide | 3 |
| A 17% titanium trichloride solution | 6 |
| Water | 68 |
| Total | 100 |

The polymerization was carried out according to the method described in Example 1. After polymerization, the pH was adjusted to 9, and 400 parts of acetone were added to precipitate the 2-hydroxynaphthoic-anilide-bonded-polymer. The precipitate was filtered, washed with acetone and dried in open air.

EXAMPLE 25

2 - hydroxynaphthoic (4' - amino)-O-toluidide was diazotized and stabilized using zinc chloride according to the method described in Example 1.

A mixture was then formulated as follows:

| | Parts |
|---|---|
| A 15% paste containing thus obtained stabilized diazonium salt | 20 |
| Acrylic acid | 6 |
| γ-Chloro-β-hydroxy-η-propyl methacrylate | 0.3 |
| Polyethyleneglycol alkyl ether | 0.1 |
| A 17% titanium trichloride solution | 6 |
| Water | 67.6 |
| Total | 100 |

The polymerization was carried out according to the method described in Example 1. After polymerization, the pH was adjusted to 9 with a 10% aqueous solution of sodium hydroxide and 600 parts of methyl alcohol were added to precipitate the 2-hydroxynaphthoic-O-toluidide-bonded-polymer. The precipitate was filtered, washed with methanol and dried in open air.

EXAMPLE 26

2-hydroxynaphthoic (3'-amino) anilide was diazotized and stabilized using stannic chloride instead of zinc chloride according to the method described in Example 1.

A mixture was then formulated as follows:

| | Parts |
|---|---|
| A 15% paste containing the thus obtained stabilized diazonium salt | 20 |
| Acrylamide | 7 |
| 17% aqueous solution of titanium trichloride | 9 |
| Water | 64 |
| Total | 100 |

The polymerization was carried out according to the method described in Example 1. After polymerization, 600 parts of methyl alcohol were added to precipitate the coupler-bonded-polymer. The precipitate was filtered, washed with methanol and dried in open air.

EXAMPLE 27

1 - (m - amino phenyl) - 3 - methyl - 5 - pyrazolone was diazotized and stabilized using zinc chloride according to the method described in Example 1.

A mixture was then formulated as follows:

| | Parts |
|---|---|
| A 15% paste containing the thus obtained stabilized diazonium salt | 20 |
| Ethyl acrylate | 6 |
| Acrylonitrile | 4 |
| Aqueous solution of titanium trichloride (17%) | 9 |
| Water | 61 |
| Total | 100 |

The polymerization was carried out according to the method described in Example 1. After polymerization, 300 parts of methyl alcohol were added to precipitate the coupler-bonded-polymer. The precipitate was filtered, washed with methanol and dried in open air.

EXAMPLE 28

A quantity of 5 parts of the methylolated chromogen-bonded-polymer, prepared according to the method described in Example 2, was dissolved in 95 parts of water. Then, 50 parts of 10% aqueous solution of sodium bisulfite were added to the solution and the pH of the solution was adjusted to 10 with a 5% aqueous solution of sodium carbonate. A sulfonation reaction was carried out at 60° C., for 3 hours. After filtration, 2 parts of sodium chloride and 500 parts of methyl alcohol were added to precipitate the chromogen-bonded-polymer. The precipitate was filtered, washed with 10 parts of acetone and dried in open air.

EXAMPLE 29

A quantity of 5 parts of the chromogen-bonded-polymer prepared according to the method described in Example 10 was dissolved in 95 parts of ethyleneglycol monomethyl ether monoacetate. Then, a quantity of 13 parts of 20% ethyleneglycol monoethyl ether monoacetate solution of diethylamine was added dropwise to the solution at 50° C. for about 1 hour. After stirring for 2 hours at 65° C., the resulting solution was cooled to 15° C. and then poured into 5,000 parts of a 0.5% aqueous solution of sodium hydroxide to precipitate the chromogen-bonded-polymer. The precipitate was filtered, washed with 20 parts of water, and then dried in open air.

EXAMPLE 30

The following components were mixed together:

| | Parts |
|---|---|
| 5% solution of chromogen-bonded-polymer which was obtained according to the method described in Example 3 | 35 |
| Polyethyleneglycolalkylether | 1 |
| Mineral turpene | 64 |
| Total | 100 |

The mixture thus obtained was vigorously stirred in a homogenizing mixer to prepare an oil-in-water type of emulsion for use as a textile printing paste. This emulsion was printed on a cloth by a gravure-type printing machine, dried on a steam cylinder and heated at 130° C. for 5 minutes in air to obtain a clear printed cloth having high resistance against abrasion, washing and organic solvents.

EXAMPLE 31

In a reaction vessel, a latex of approximately 28% resin content was prepared in accordance with the following formulation by an emulsion polymerization.

| | Parts |
|---|---|
| N-methylolacrylamide | 2.0 |
| Butyl acrylate | 13.0 |
| Vinylidene chloride | 13.0 |
| Sodium hydroxide | 0.2 |
| Potassium dihydrogen phosphate | 0.8 |
| Sodium alkylarylsulfonate | 0.95 |
| Sodium persulfate | 0.05 |
| Water | 70.00 |
| Total | 100 |

The following components were then mixed together:

| | Parts |
|---|---|
| 5% solution of chromogen-bonded-polymer which was obtained according to the method described in Example 5 | 30 |
| Latex prepared above | 10 |
| Polyethyleneglycolnonylphenylether | 1 |
| Mineral turpene | 59 |
| Total | 100 |

The mixture thus formed was strongly stirred in a homogenizing mixer to prepare an oil-in-water type of emulsion for use as a textile printing paste.

This emulsion was printed on a cloth by a printing machine, dried on a steam cylinder and heated at 130° C. for 5 minutes in air to obtain clear printed cloth having a high resistance against abrasion, washing and organic solvents.

EXAMPLE 32

The chromogen-bonded-polymer solution prepared according to the method described in Example 3 was added with hydrochloric acid to acidify it or was added with aqueous solution of barium chloride and thus unsoluble chromogen-bonded-polymer paste was prepared as the precipitate.

The following components were mixed together:

| | Parts |
|---|---|
| The above insoluble chromogen-bonded-polymer paste | 80 |
| Polyethyleneglycolnonylphenylether | 20 |
| Total | 100 |

The mixture was vigorously stirred in a homogenizing mixer to prepare a water-dispersible chromogen-bonded-polymer slurry.

Further, the following components were mixed together:

| | Parts |
|---|---|
| The above water - dispersible chromogen - bonded-polymer slurry | 10 |
| The latex prepared according to the method described in Example 31 | 27 |
| 2% aqueous solution of hexamethylene bis-ethylene urea | 3 |
| Mineral turpene | 60 |
| Total | 100 |

The mixture was strongly stirred in a homogenizing mixer to prepare an oil-in-water type of emulsion for use as a textile printing paste.

This emulsion was printed on a cloth by a printing machine, dried on a steam cylinder and then heated at 130° C. for 5 minutes in air to obtain a clear printed cloth having high resistance against abrasion, washing and organic solvents.

EXAMPLE 33

| | Parts |
|---|---|
| Glycidylmethacrylate | 4.0 |
| Acrylamide | 1.0 |
| Butylacrylate | 25.0 |
| Sodium alkylarylsulfonate | 0.9 |
| Ammonium persulfate | 0.1 |
| Water | 69.0 |
| Total | 100 |

The above components were reacted together at 70–80° C. for 6 hours in an emulsion polymerization vessel. The latex is thus prepared with about 28% of resin content.

The following components were mixed together:

| | Parts |
|---|---|
| 5% solution of chromogen-bonded-polymer prepared according to the method described in Example 7 | 25 |
| The latex prepared described in above | 5 |
| Mineral turpene | 70 |
| Total | 100 |

The mixture was strongly stirred in a homogenizing mixer to prepare an oil-in-water type of emulsion for use as a textile printing paste.

This emulsion was printed on a cloth by a silk-screen printing machine, dried on a steam cylinder, and after dipping the cloth in a 0.2% aqueous sodium hydroxide solution, it was heated and dried to obtain a clear printed cloth having high resistance against abrasion, washing and organic solvents.

EXAMPLE 34

The following components were mixed together:

| | Parts |
|---|---|
| Chromogen - bonded - polymer solution prepared according to the method described in Example 2 | 25 |
| 2% aqueous solution of hexamethylene bis-ethylene urea | 5 |
| Polyethyleneglycolalkylether | 1 |
| Mineral turpene | 69 |
| Total | 100 |

The mixture was strongly stirred in a homogenizing mixer to prepare an oil-in-water type of emulsion for use as a textile printing paste.

This emulsion was printed on the warps only by a screen-printing machine, dried on a steam cylinder and heated. Then, they were woven together with white or colored wefts to obtain a clear and beautiful screen printed cloth having high resistance against chemicals and superior physical properties.

EXAMPLE 35

The following components were mixed together:

| | Parts |
|---|---|
| Stannous chloride | 5 |
| Urea | 3 |
| Water | 31 |
| Polyethyleneglycol nonylphenylether | 1 |
| Mineral turpene | 60 |
| Total | 100 |

The mixture was stirred in a homogenizing mixer to prepare an oil-in-water type of emulsion for use as a resistant printing paste.

| | Parts |
|---|---|
| Above oil-in-water type of emulsion | 90 |
| 5% solution of chromogen-bonded-polymer prepared according to the method described in Example 5 | 10 |
| Total | 100 |

The above components were mixed together to prepare a resistant color printing paste.

The paste was then printed on a cloth, which was steeped in Naphthol As solution, and dried on a steam cylinder. The cloth was then colored in a developer solution and washed. After eliminating the excess of Napthtol As with an 0.2% aqueous solution of sodium hydroxide, the colored cloth was washed and solution of sodium hydroxide, the colored cloth was washed and dried on a steam cylinder to obtain clear colored cloth having high resistance against abrasion, washing, and organic solvents.

EXAMPLE 36

The following components were mixed together:

| | Parts |
|---|---|
| 5% aqueous solution of methylcellulose | 50 |
| 10% solution of chromogen-bonded-polymer prepared by the method described in Example 1 | 20 |
| Zinc oxide paste (1:1) | 20 |
| Water | 10 |
| Total | 100 |

The resistant printing paste thus obtained was printed on a cloth. After drying and heat-treating it, the cloth was steeped in an aniline padding solution which consisted of the following components:

| | Parts |
|---|---|
| 3% methylcellulose aqueous solution | 8 |
| Aniline oil | 0.5 |
| Aniline salt | 8.5 |
| Potassium ferrocyanide | 5.4 |
| Sodium chlorate | 2 |
| Water | 74.6 |
| Total | 100.0 |

The cloth was dried on a steam cylinder for 15 minutes, then treated with sodium dichromate solution at 50° C. After washing and boiling the cloth, a clear resistant colored cloth was obtained.

EXAMPLE 37

The following components were mixed together to prepare a paste:

| | Parts |
|---|---|
| Ammonia solution (28%) | 2 |
| Water | 32 |
| Polyethyleneglycol octylphenylether | 1 |
| Mineral turpene | 65 |
| Total | 100 |

The following were then mixed together:

| | Parts |
|---|---|
| 5% solution of chromogen-bonded-polymer prepared according to the method described in Example 16 | 10 |
| Above described paste | 75 |
| Rongalite solution (1:1) | 15 |
| Total | 100 |

Thereafter, the mixture was printed on a cloth which was already dyed with direct dyestuff, and the cloth was then dried on a steam cylinder, heated for 5–15 minutes according to an ordinary steam-heating treatment, and washed and dried to obtain a clear and beautiful discharge printed cloth having an excellent resistance to chemicals and superior physical properties.

EXAMPLE 38

A printing paste which consisted of the following:

| | Parts |
|---|---|
| 5% chromogen-bonded-polymer solution as described in Example 1 | 35 |
| Polyethyleneglycol alkylether | 1 |
| Mineral turpene | 64 |
| Total | 100 |

This paste was printed on a refined and bleached cloth, and after the cloth was dried on a steam cylinder, a mixture of the following components:

| | Parts |
|---|---|
| Rapidogen dyestuff (Red) | 5 |
| Methanol | 5 |
| 38° Bé. aqueous sodium hydroxide solution | 3 |
| Water | 12 |
| 5% aqueous solution of methylcellulose | 75 |
| Total | 100 | was printed on it. Then, the cloth was heated in a rapidager to develop the color. Two colored pattern cloth was obtained through washing, soaping, washing and drying steps.

EXAMPLE 39

Water was pentrated into a mixed spun cloth of terephethalic fibers and cotton fibers before the cloth was steeped in a Jigger with a chromogen-bonded-polymer solution prepared according to the method described in Example 6 and with 200 liters of water (ratio 1:4). Dyeing was carried out so that a desired color was obtained under the elevated temperature.

After dyeing, the cloth was washed and dried on a steam cylinder, and then, it was heated at 130° C. for 5 minutes to obtain a clear printed cloth having high resistance to abrasion, washing, and organic solvents.

EXAMPLE 40

95 parts of 3% aqueous solution of chromogen-bonded-polymer prepared according to the method described in Example 16 and 5 parts of 10% aqueous solution of melamine-formalin condensate were mixed together with 20 times their volume of water to prepare a dyeing bath.

After a refined and bleached cotton yarn was dyed with the above dyeing bath at 130° C. for 5 minutes, there was obtained a beautiful printed cloth having high chemical and physical resistance properties.

EXAMPLE 41

The following components were mixed together:

| | Parts |
|---|---|
| Latex of chromogen-bonded-polymer prepared according to the method described in Example 3 | 30 |
| Polyethyleneglycol laurylether | 1 |
| Mineral turpene | 39 |
| Xylene solution of long-oil alkyd resin 50% | 30 |
| Total | 100 |

The mixture was strongly stirred in a homogenized mixer to prepare an oil-in-water type printing paste.

This paste was printed on a non-woven fabric which was prepared by using various binders together with synthetic fibers such as polyacrylonitrile, polyamide, polyester, etc. and natural fibers such as cotton. Then, the fabrics were dried on a steam cylinder and heated at 130° C. for 5 minutes in air to obtain a clear and brilliant color printed non-woven fabric having excellent chemical and physical properties.

EXAMPLE 42

3% of pulp solution was prepared by fully beating pulp in a beater and the solution was made up 100 parts by the addition of water thereto.

Thereafter, the solution was blended together with 10 parts of a mixture which consisted of rosin-soap, titanium dioxide and 5% aqueous solution of chromogen-bonded-polymer prepared according to the method described in Example 2. By adjusting the pH of the pulp solution to be slightly acid (pH=4.5–5.0) by adding 0.2 part of aluminum sulfate, the chromogen-bonded-polymer was fixed.

A colored paper of 130 g./m.$^2$ was manufactured by a paper-making machine.

According to the method of this example, the yield of the filler increased considerably compared with that of the filler of the usual colored paper, and at the same time the quality of the obtained paper improved since the deterioration of paper usually caused by filling of pigment was eliminated.

EXAMPLE 43

A mixture consisting of the following components:

| | Parts |
|---|---|
| Latex prepared according to the method described in Example 31 | 80 |
| 10% solution of chromogen-bonded-polymer prepared according to the method described in Example 6 | 20 |
| Total | 100 | was vigorously stirred in a mixer.

The mixture was homogeneously sprayed on a random-web consisting of 75% of nylon and 25% of staple-fiber and the web was dried at 130° C. for 10 minutes to obtain a strong and soft colored non-woven fabric having excellent properties.

EXAMPLE 44

358 parts of 4.8% aqueous sodium hydroxide solution and 80 parts of cellulose xanthate were mixed together and made up to 438 parts. 10 parts of 5% solution of chromogen-bonded-polymer prepared according to the method described in Example 1 and 0.3 parts of titanium dioxide were mixed with the solution obtained above, and after filtering and defoaming, it was spun out into a common coagulation bath fiber with stretch being drawn in a second bath at 80–90° C. After washing and drying at 50–60° C. for 3 hours, viscose rayon was obtained.

With this method, defects such as a falling out of the pigment in the coagulation bath or limits imposed on the particle size which can be used, may be completely eliminated.

EXAMPLE 45

80 parts of polyvinyl alcohol which were completely free from sodium acetate, were charged in a dissolver and diluted, to a 15% solution by an addition of 453 parts of water. The polyvinyl alcohol was completely dissolved either by adjusting the pH of the solution to be slightly alkaline (pH=8–9), or by keeping the solution at 60–80° C. for 10–15 hours.

The solution thus obtained was stirred vigorously together with 10 parts of 5% solution of the chromogen-bonded-polymer prepared according to the method described in Example 16, and a homogeneous solution was thereby obtained.

After filtering and defoaming, the latter solution was spun out into a coagulation bath, heated at 200–300° C. for a few minutes, and acetalized to obtain a colored polyvinyl fiber.

According to the method of this example, such defects as the falling out of the pigment in the coagulation bath or limits imposed on the particle size which may be used, may be completely eliminated.

EXAMPLE 46

5 parts of 10% dimethylformamide solution of the chromogen-bonded-polymer prepared according to the method described in Example 19 and 95 parts of 10% dimethylformamide solution of polyacrylonitrile were mixed together to obtain a homogeneous solution.

The solution was spun to a clear colored yarn by a conventional wet yarn spinning process. A clear and beautiful polyacrylonitrile yarn was thus obtained.

EXAMPLE 47

Printing ink for cellulose or polyethylene film was prepared from the following components:

| | Parts |
|---|---|
| 50% solution of the oil-soluble chromogen-bonded-polymer described in Example 4 | 10 |
| Polyamide condensate | 30 |
| Butanol | 30 |
| Toluene | 30 |
| Total | 100 |

The above chromogen-bonded-polymer, composed of a self-crosslinkable resin, attached many of the pigment molecules to form pigment particles. Therefore, the colored prints obtained by a gravure printing had excellent properties against rub, and solvents.

EXAMPLE 48

| | Parts |
|---|---|
| The chromogen-bonded-polymer described in Example 13 | 27.9 |
| Barium sulfate | 13.1 |
| Printing ink varnish | 59.0 |
| Total | 100.0 |

Offset printing ink was prepared from the formula above by mixing them with 3-rolled mill.

The above chromogen-bonded-polymer composed of a self-crosslinkable resin, attached many of the pigment molecules. In addition, since it had an organophilic group in its structure, the color was dispersed well into a printing ink varnish. The thus obtained printing ink had excellent tinting strength and printability. Color prints were obtained by offset printing which had outstanding rub-fastness, and other advantageous physical and chemical properties.

EXAMPLE 49

An oil-in-water type emulsion printing ink was obtained from the following composition:

| | Parts |
|---|---|
| 5% solution of chromogen-bonded-polymer described in Example 5 | 35 |
| Polyethyleneglycol alkylether | 1 |
| Xylol | 64 |
| Total | 100 |

This emulsion was printed on a paper by gravure printing with the result that a beautiful print was obtained after heating to dryness. The color was firmly fixed on a paper fiber by the reaction of it with the fiber whereby the paper so printed had excellent properties against bleeding, rubbing, and solvents.

EXAMPLE 50

A water base printing ink was obtained by thoroughly mixing the following components in a colloid mill:

| | Parts |
|---|---|
| 5% chromogen-bonded-polymer solution described in Example 7 | 35 |
| Gum arabic | 50 |
| Water | 15 |
| Total | 100 |

The printing ink was printed on a paper to obtain a wall-paper by flexographic printing. After heating the paper to dryness, the color was firmly fixed on the paper fiber because of the reaction of it with the fiber whereby the paper so printed had excellent properties against bleeding, rubbing, and solvents.

EXAMPLE 51

5% xylene-cellosolveacetate - methylethylketone (4:3:3) solution of the chromogen-bonded-polymer described in Example 12 was sprayed uniformly on a surface of a leather by a high pressure spray gun and the leather was dried in open air to obtain a colored leather.

EXAMPLE 52

|  | Parts |
|---|---|
| 8% chromogen-bonded-polymer solution described Example 3 | 35.0 |
| Polyethyleneglycol alkylether | 1.0 |
| Mineral turpene | 64.0 |
| Total | 100.0 |

The above components were mixed together and strongly stirred in a homogenized mixer to obtain an oil-in-water type emulsion printing paste.

The paste was printed on de-fatted leather. After the drying of the leather in open air at 40° C., a printed leather was obtained.

EXAMPLE 53

10 parts of the chromogen-bonded-polymer prepared according to the method described in Example 6 were dissolved in 200 parts of water.

De-fatted leather was dipped in the latter solution at room temperature for 5 minutes. After drying the leather at 40° C., a dip-dyed leather having excellent fastness was obtained which was superior in properties to one obtained from a conventional method and had much gross with only a calender-treating. According to this example, the dyeing temperature may be relatively low compared to that of a conventional method, whereby it is much more economical.

EXAMPLE 54

Chromogen-bonded-polymer prepared according to the method described in Example 17, about twice glycerine and well-known suitable additives were mixed together to obtain a stamping ink.

Printed patterns made with this ink on paper or cloth by well-known printing methods had excellent properties with regard to physical and chemical resistance.

Similar coloring was also carried out using the chromogen-bonded-polymer prepared according to Example 21 instead of Example 17.

EXAMPLE 55

A mixture was made of the following components:

|  | Parts |
|---|---|
| The oil soluble chromogen-bonded-polymer powder prepared according to the method described in Example 13 | 80 |
| Linseed oil | 20 |
| Total | 100 |

The above components were blended and tubed to obtain an oil paint. This paint had excellent dispersibility, concentration and gloss. Pictures painted with this paint had bright hues, and strong rub-fastness.

EXAMPLE 56

|  | Parts |
|---|---|
| 10% solution of the chromogen-bonded-polymer prepared according to the method described in Example 14 | 50 |
| Aqueous gum arabic solution (30%) | 30 |
| Glycerine | 20 |
| Total | 100 |

The above components were mixed together to obtain a water paint. Painting was carried out with the paint, the paint being suitably diluted with water. Resulting pictures were excellent in rub-fastness, because the chromogen-bonded-polymer fixed to cellulose in the paper. The pictures had bright hues, and excellent chemical resistance.

EXAMPLE 57

10 parts of oil soluble chromogen-bonded-polymer prepared according to the method described in Example 4, 30 parts of alkyd resin, 35 parts of butanol and 25 parts of toluol were blended together in a dissolver to obtain a printing ink for hardboard printing.

The printing ink was printed on the well base-coated hardboard by a gravure-offset printing machine. The board was then dried in open air and heated by hot air to obtain a colored hardboard having excellent properties as to coloring and strong rub-fastness.

According to the conventional method of hardboard printing, a clear resin top-coating over the printed surfaces had been required. However, according to this method of printing, prints having an excellent rub-fastness were obtained without the need for the clear resin topcoat treatment.

EXAMPLE 58

In an aqueous solution of chromogen-bonded-polymer described in Example 8, woodchip was dipped and then dried to obtain colored chip having strong fastness for chemical resistance.

EXAMPLE 59

A wooden product was uniformly sprayed with the xylene-ethylcellosolve-methyl ethyl ketone (2:1:1) solution of the chromogen-bonded-polymer prepared according to the method described in Example 11 using a high-pressure spray gun.

After drying the wooden product in open air, a colored wooden product was obtained, having excellent color fastness.

EXAMPLE 60

Polyvinyl acetate emulsion was prepared by polymerizing the following components:

|  | Parts |
|---|---|
| 5% aqueous solution of polyvinyl alcohol | 200 |
| Vinyl acetate | 100 |
| Potassium persulfate | 0.7 |
| Dimethylphthalate | 10 |
| Total | 310.7 |

9 parts of titanium dioxide, 10 parts of water and 5 parts of 5% aqueous solution of sodium phosphate were mixed together with the polyvinylacetate emulsion prepared above to obtain a white polyvinylacetate emulsion polymerization paint. After adding thereto a chromogen-bonded-polymer prepared according to the method described in Example 3, the emulsion paint obtained was applied to the wooden product to obtain a beautiful colored wooden product having an excellent durability.

EXAMPLE 61

6 parts of casein and 10 parts of starch were mixed together with 30 parts of water. After permitting the starch and the casein to swell, 20 parts of 5% aqueous solution of sodium hydroxide was mixed therewith and heated at 60° C. to dissolve the casein and starch to produce a clear solution.

50 parts of 3% aqueous solution of sodium oleate were then added to the starch-casein solution to prepare a concentrated solution of soluble casein paint. The chromogen-bonded-polymer prepared according to the method described in Example 7 was mixed with this paint and the mixture was stirred.

Woodchip was painted with the resulting colored paint, and air-dried to obtain a colored woodchip having an excellent durability.

EXAMPLE 62

1 part of chromogen-bonded-polymer prepared according to the method described in Example 9 was dissolved in 6 parts of ethyl cellosolve and mixed with 17 parts of 40% xylenemethyl ethyl ketone (1:1) mixed solution of thermosetting acrylic resin and 3 parts of 50% cellosolve acetate solution of epoxy resin.

After being diluted to a suitable viscosity, the resulting paint was sprayed on steel plate. After heating the sprayed paint at 150° C. for 30 minutes, a transparent colored steel plate was obtained having excellent fastness for mechanical tests.

EXAMPLE 63

A mixture composed of 300 parts of 38% formalin and 100 parts of urea was boiled for 4 hours at 40–45° C. After evaporating off the moisture from the mixture, the mixture was distillated under reduced pressure to obtain a transparent and sticky condensate as distillation residue. Thereafter, the condensate was dissolved in an alcohol and the thus-prepared resin solution was applied over boards.

A top board was dipped in the resin-solution in which there was dissolved a chromogen-bonded-polymer prepared according to the method described in Example 1. After air-drying the dipped board, discrete wooden boards were laminated and pressed thereon at 130° C. under a pressure of 1,500 lbs./in.² whereby a colored laminated board having excellent properties was thus obtained.

EXAMPLE 64

90 parts of rubber-latex which had been adjusted to 25% rubber content by the addition of water and 10 parts of the colored latex prepared according to the method described in Example 3 were mixed homogeneously to obtain a colored rubber latex.

By coagulating and after-treating by known methods, there was obtained a beautifully colored rubber.

According to this method, the crosslinking of the crude rubber was so much accelerated by the heat of vulcanization that the resulting rubber was free from the deterioration and oxidation which often results from known methods of coloring.

EXAMPLE 65

The following components were blended together:

| | Part |
|---|---|
| Chromogen-bonded-polymer prepared according to the method described in Example 13 | 1 |
| Process oil | 1 | and then mixed together with 100 parts of crude rubber by a 2-roll mill to obtain a beautifully colored rubber sheet.

According to this method, the rubber was exothermed to be at 100–130° C. during the rolling process. The operation time required was about 15 minutes, whereby the crosslinking of the rubber was much accelerated. The rapid crosslinking served to reinforce the rubber and also to eliminate its deterioration, or oxidation.

EXAMPLE 66

95 parts of xylene-butylacetate (1:1) were mixed with 5 parts of chromogen-bonded-polymer prepared according to the method described in Example 10 to obtain a colored solution.

With a high pressure spray-gun, the solution was sprayed uniformly on the surface of a well-dried concrete wall and the wall was dried in open air to obtain a colored concrete wall.

According to this method of coloring, the surface of concrete wall was covered with a beautiful color which had an excellent covering power. Thus, the coloring solution obtained with the method of this example is advantageously utilizable for coloring materials consisting of cement, slate, mortar, ect.

EXAMPLE 67

The following mixture was prepared:

| | Parts |
|---|---|
| Methylmethacrylate | 150 |
| Azo bisisobutylonitrile | 0.4 |
| Chromogen-bonded-polymer powder prepared according to the method described in Example 18 | 0.1 |
| Total | 150.5 |

The chromogen-bonded-polymer powder and azobisisobutylonitrile was dissolved in methylmethacrylate. After heating at 80° C. for 10 minutes, the solution was cooled and then filtered.

The thus-obtained syrupy solution was poured between two glass plates which were disposed in parallel, and held in a water-bath at 50° C. in order to polymerize the monomer between the plates to produce a colored polymethylmethacrylate plate.

EXAMPLE 68

The following mixture was made:

| | Parts |
|---|---|
| Polymethylmethacrylate | 150 |
| Chromogen-bonded-polymer powder prepared according to the method described in Example 18 | 0.1 |
| Total | 150.1 |

The mixture was well mixed by tumbling and a molded polymethylmethacrylate product uniformly colored was obtained by feeding the mixture into a pressurized molding machine.

EXAMPLE 69

1000 parts of fatty acid and 1 part of chromogen-bonded-polymer prepared according to the method described in Example 15 were mixed together. According to the conventional process for making soap, the mixture was saponified, salted out, cooled and cut to prepare the colored soap.

Similar coloring was also carried out using the chromogen-bonded-polymer prepared according to Example 20 instead of Example 15.

EXAMPLE 70

2 parts of chromogen-bonded-polymer prepared according to the method described in Example 22 are were dissolved in 3 parts of benzyl alcohol, and well-known suitable additives were mixed together therewith to obtain a ball-point pen ink.

In known ball-point pen inks, crystals of dye form and grow after a long storage period. However, in the ink made by this example, such phenomena did not occur. Written material written by this ink did not bleed in oils and fats which is an advantageous property for ball-point pen ink.

EXAMPLE 71

A quantity of 2 parts of 5% aqueous solution of the chromogen-bonded-polymer prepared according to the method described in Example 14 was homogeneously mixed with 98 parts of 20% aqueous solution of a detergent such as sodium alkylbenzene sulfonate containing 3 parts of sodium sulfate. This solution was useful for a detergent solution for washing. And when this solution was dried with a spray drier, a colored detergent powder was obtained.

EXAMPLE 72

A clear solution of the chromogen-bonded-polymer prepared according to the method described in Example 23, and the well-known additive, ethyleneglycol, were instilled into a felt pen type fountain pen. This water type felt pen ink was also employable in a nylon filament pen type fountain pen.

EXAMPLE 73

A quantity of 5 parts of the coupler-bonded-polymer prepared according to the method described in Example 24 was mixed with 20 parts of 1% aqueous solution of sodium hydroxide and diluted with water to 100 parts. This solution was then mixed with 4 parts of 50% aqueous solution of hexamethyl methylol melamine and 20 parts of latex (40% of solid content), copolymerized ethylacrylate-styrene-N-methylolacrylamide (80:18:2 by weight percent). A white polyester cloth was padded in a bath of the above obtained mixture for 10 minutes, squeezed through a mangle and dried in open air. The impregnated cloth with the coupler-bonded-polymer was dipped for 30 minutes in a developing bath containing diazotized 4.4'-diaminodiphenylamine. The developed cloth was squeezed through a mangle, rinsed with water and dried on a steam cylinder. After curing at 140° C. for 5 minutes, a colored polyester cloth having excellent properties was obtained.

EXAMPLE 74

A quantity of 2 parts of the coupler-bonded-polymer prepared according to the method described in Example 26 was dissolved in 18 parts of 1.5% aqueous solution of sodium hydroxide. In an another vessel 4-chloro-2-anisidine was diazotized and stabilized with sarcosine sodium salt to prepare a stabilized diazo-amino compound of the following structure:

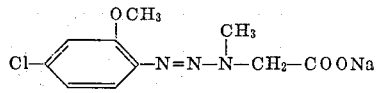

Thereafter, 0.55 part of the above stabilized diazo-amino compound were added to the aqueous solution of the coupler-bonded-polymer and dissolved completely. And then 15 parts of 5% solution of sodium aliginate were mixed with the above-obtained mixture of the coupler-bonded-polymer and the stabilized diazoamino compound to prepare a printing paste. The printing paste was printed on a white cloth consisting of cotton-polyester fiber using a screen printing machine. The printed cloth was treated in an acidic steaming bath for 10 minutes and then washed in a dilute solution of soap. After rinsing in water and drying on a steam cylinder, a printed cloth was obtained.

EXAMPLE 75

A quantity of 10 parts of the coupler-bonded-polymer prepared according to the method described in Example 27 was dissolved in 90 parts of acetone. A quantity of 4 parts of above solution was mixed with 25 parts of 8% acetone solution of vinyl chloride-acrylonitrile (60:40) polymer. The above prepared mixture was spun according to the usual dry spinning process. The produced fiber containing the coupler-bonded-polymer was impregnated for 60 minutes in a bath containing diazotized 4'-amino-2'.5'-dimethoxybenzanilide. After rinsing in water, colored fiber was obtained.

EXAMPLE 76

A quantity of 3 parts of the coupler-bonded-polymer prepared according to the method described in Example 25 was added to 8 parts of 10% aqueous solution of sodium hydroxide and diluted with water to 200 parts. A leather, after impregnated with warm water and squeezed through a mangle, was dipped for 10 minutes in the above prepared solution containing the coupler-bonded-polymer was squeezed through a mangle and dipped for 10 minutes in a bath containing diazotized product of 4-nitro-phenyl-azo-2,5-dimethoxy-4-aminobenzene. After developing, a colored leather was squeezed through a mangle, put into a bath of pH 3 containing sulfonic acid and sodium chloride and took out from the bath. The obtained colored leather was tanned by conventional method in an acidic bath of sulfuric acid using sodium dichromate and glucose.

EXAMPLE 77

A quantity of 4 parts of the coupler-bonded-polymer prepared according to the method described in Example 26 was mixed with 6 parts of 5% aqueous solution of sodium hydroxide and diluted with water to 40 parts. In another vessel, 2.5-dichloro-aniline was diazotized and stabilized with N-methyl taurine sodium salt to obtain the diazoamino compound of the following structure:

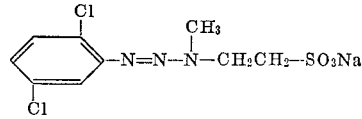

9.6 parts of the above diazoamine compound were added to the aqueous solution of the coupler-bonded-polymer and dissolved completely. And then 30 parts of O/W emulsion paste of mineral spirit, polyethyleneglycoldi-stearate and water (70:2:28) were mixed with the above obtained mixture of the coupler-bonded-polymer and the diazoamino compound to prepare a printing paste. The printing paste was printed on a leather using a screen printing machine and dried at 60° C. for 10 minutes. The printed leather was treated in a bath of 0.2% aqueous solution of acetic acid at 60° C. for 30 minutes. The printed leather having good properties was obtained by rinsing with water, squeezing with a mangle and dried in open air.

EXAMPLE 78

The following components were mixed together:

| | Parts |
|---|---|
| A 5% solution of chromogen-bonded polymer prepared according to the method described in Example 28 | 40 |
| Glyoxal | 0.5 |
| Water | 59.5 |
| Total | 100 |

A white cotton cloth was dipped in a bath of the above solution, squeezed through a mangle, dried at 60° C. and cured at 130° C. for 5 minutes to obtain a slightly colored cloth having good properties.

EXAMPLE 79

A quantity of 2 parts of the chromogen-bonded-polymer was dissolved in 98 parts of a 10% aqueous solution of acetic acid. A white cotton cloth was dipped in a dyeing bath consisting of the following components:

| | Parts |
|---|---|
| A 2% acidic aqueous solution of the chromogen-bonded-polymer prepared according to the method described in Example 29 | 98 |
| N.N.N'.N'. - tetraglycidyl hexamethylenediamine diacotic acid salt | 0.5 |
| Hexamethylene diamine diacetic acid salt | 0.5 |
| Water | 1 |
| Total | 100 |

After dipping, the dipped cloth was placed in a 0.3% alkaline aqueous solution of sodium hydroxide, rinsed with water and dried. After this treatment, a colored cloth was obtained.

While there have been described what are considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed as new and desired to be secured by Letters Patent is:

1. In a process for making a colored polymer, the improvement which comprises the steps of diazotizing a aromatic coupler containing at least one radical selected from hydroxyl, keto pyrazolyl and ketoamide and containing a primary amino radical to produce a coupler containing a diazonium radical; stabilizing said coupler containing a diazonium radical with a stabilizer selected from the group consisting of heavy metal salts; fluoroboric acid and alkali metal salts thereof; arylsulfonic acids, alkyl arylsulfonic acid, alkyl sulfuric acids and salts thereof; primary and secondary amino compounds, and thiophenols to produce a stabilized diazonium or diazo compound of said coupler; mixing said stabilized diazonium or diazo compound of the coupler with an ethylenically unsaturated polymerizable monomer; selected from acrylamides, carboxylic acids and esters and polymerizing said monomer in a water based polymerization process utilizing said stabilized diazonium or diazo compound of the coupler as an initiator for the polymerization of said monomer to produce said coupler-bonded-polymer.

2. In a process as defined in claim 1, wherein said coupler containing a primary amino radical is selected from the group consisting of
2-hydroxy naphthoic-(amino)-arylamides,
2-hydroxy naphthoic-(sulfo-amino)-arylamides,
1-(aminoaryl)-5-pyrazolones,
1-(sulfo-aminoaryl)-5-pyrazolones;
acetoacetic-(amino)-arylamides,
acetoacetic-(sulfo-amino)-arylamides;
(amino)-naphthols,
(sulfo-amino)-naphthols; and aminophenols.

3. In a process as defined in claim 1, wherein said coupler containing a primary amino radical is selected from the group consisting of
2-hydroxy naphthoic-(3'-amino)-anilide,
2-hydroxynaphthoic-(4'-amino)-anilide,
2-hydroxynaphthoic-(4'-amino)-O-toluidide,
2-hydroxynaphthoic-(5'-amino)-O-toluidide,
2-hydroxynaphthoic-(5'-amino)-O-anisidide and
sulfonated-2-hydroxynaphthoic-(3'-amino)-anilide;
1-(m-amonophenyl)-3-methyl-5-pyrazolone,
1-(p-aminophenyl)-3-methyl-5-pyrazolone and
1-(O-sulfo-p-aminophenyl)-3-methyl-5-pyrazolone;
acetoacetic-(3'-amino)-anilide,
acetoacetic-(4'-amino)-anilide,
(4'-amino)-N-acetoacetic phthalimide and
sulfonated acetoacetic-(4'-amino)-anilide; and
5-amino-naphthol-1, 7-amino-naphthol-2 and 3-sulfo-6-amino-naphthol-1.

4. In a process as defined in claim 1, wherein said stabilizer is selected from the group consisting of zinc chloride, stannic chloride, calcium chloride, barium chloride and aluminum chloride; fluoroboric acid, sodium fluoroborate and potassium fluoroborate; dodecylbenzene sulfonic acid, p-chlorobenzene sulfonic acid, naphthalene-1, 5-disulfonic acid, naphthalene-2.6-disulfonic acid and poly-methylene-naphthalene-polysulfonic acid, lauryl sulfuric acid and dauryl sulfate; 2-methylimino-benzoic acid-5-sulfonic acid, N-methyltaurine and sarcosine; and β-thionaphthol and 4-t-butylthiophenol.

5. In a process as defined in claim 1, wherein said ethylenically unsaturated polymerizable monomer is selected from the group consisting of methacrylamide, N-methylmethylol acrylamide, methyl methacrylate, butyl acrylate, ethyleneglycolmonoacrylate, dilaurylitaconate, acrylic acid, methacrylic acid and polymerizable comonomers of acrylonitrile and ethyl acrylate.

6. In a process for making a colored polymer, the improvement which comprises the steps of:
diazotizing 2-hydroxy naphthoic-(3'-amino)-anilide to produce a diazotized product;
stabilizing said diazotized product with a stabilizer to produce a stabilized diazonium compound;
mixing said stabilized diazonium compound product with acrylamide; in water and
polymerizing the acrylamide by utilizing said stabilized diazonium compound as a polymerization initiator to produce a coupler-bonded-polymer.

7. In a process as defined in claim 6 wherein said stabilizer is zinc chloride.

References Cited

UNITED STATES PATENTS

| | | | |
|---|---|---|---|
| 3,190,860 | 6/1965 | Fertig et al. | 260—207.1 X |
| 3,190,861 | 6/1965 | Fertig et al. | 260—207.1 X |
| 2,471,959 | 5/1949 | Hunt | 260—89.5 |
| 2,526,218 | 10/1950 | Gold et al. | 260—144 |
| 3,122,533 | 2/1964 | Senn | 260—207.1 X |
| 3,251,889 | 5/1966 | Kulka | 260—141 X |
| 3,336,282 | 8/1967 | Haas | 260—93.5 X |

FOREIGN PATENTS

| | | | |
|---|---|---|---|
| 1,366,467 | 6/1964 | France | 260—89.7 |

JOSEPH L. SCHOFER, Primary Examiner

W. F. HAMROCK, Assistant Examiner

U.S. Cl. X.R.

260—47, 80.8, 49, 80.81, 63, 86.1, 85.5, 77.5, 88.3, 88.7, 78.4, 89.1, 91.5, 79, 89.3, 92.8, 80.3, 89.5, 93.5